US012241230B2

(12) United States Patent
Nagao et al.

(10) Patent No.: US 12,241,230 B2
(45) Date of Patent: Mar. 4, 2025

(54) HYDRAULIC SYSTEM FOR WORKING MACHINE

(71) Applicant: KUBOTA CORPORATION, Osaka (JP)

(72) Inventors: Kohei Nagao, Sakai (JP); Yuji Fukuda, Sakai (JP); Ryuki Nishimoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/231,856

(22) Filed: Aug. 9, 2023

(65) Prior Publication Data

US 2024/0052597 A1 Feb. 15, 2024

(30) Foreign Application Priority Data

Aug. 10, 2022 (JP) ................................ 2022-128313

(51) Int. Cl.
*E02F 9/22* (2006.01)
*F15B 11/16* (2006.01)
(Continued)

(52) U.S. Cl.
CPC .......... *E02F 9/2228* (2013.01); *E02F 9/2203* (2013.01); *E02F 9/2235* (2013.01); *E02F 9/2285* (2013.01); *F15B 11/162* (2013.01); *F15B 11/163* (2013.01); *F15B 11/165* (2013.01); *F15B 11/166* (2013.01); *F15B 13/06* (2013.01); *F15B 21/087* (2013.01); *E01H 1/056* (2013.01); *E02F 3/96* (2013.01); *E02F 9/2292* (2013.01); *E02F 9/2296* (2013.01);
(Continued)

(58) Field of Classification Search
CPC ..... F15B 11/162; F15B 11/163; F15B 11/165; F15B 11/166; F15B 2211/30555; F15B 2211/6346; F15B 2211/6323; F15B 2211/6326; F15B 2211/781; E02F 9/2203; E02F 9/2228; E02F 9/2235
See application file for complete search history.

(56) References Cited

U.S. PATENT DOCUMENTS 6,498,973 B2 * 12/2002 Dix ........................ E02F 9/2228 701/50
7,146,808 B2 * 12/2006 Devier .................. F15B 11/163 60/459
(Continued)

FOREIGN PATENT DOCUMENTS

JP 2022-057494 A 4/2022

*Primary Examiner* — Michael Leslie
(74) *Attorney, Agent, or Firm* — Keating & Bennett, LLP

(57) ABSTRACT

A hydraulic system for a working machine includes first and second hydraulic actuators actuated by hydraulic fluid delivered by a hydraulic pump, a first flow rate controller to control a first supply flow rate of hydraulic fluid supplied to the first hydraulic actuator to match a first required flow rate, a second flow rate controller to control a second supply flow rate of hydraulic fluid supplied to the second hydraulic actuator to match a second required flow rate, and a special flow rate control system to, if a sum of the first and second required flow rates is greater than a maximum delivery flow rate of the hydraulic pump, reduce the first supply flow rate to allow the second supply flow rate to approach the second required flow rate.

17 Claims, 7 Drawing Sheets

(51) Int. Cl.

| | |
|---|---|
| ***F15B 13/06*** | (2006.01) |
| ***F15B 21/08*** | (2006.01) |
| *E01H 1/05* | (2006.01) |
| *E02F 3/96* | (2006.01) |

(52) U.S. Cl.

CPC ............... *F15B 2211/30555* (2013.01); *F15B 2211/426* (2013.01); *F15B 2211/6323* (2013.01); *F15B 2211/6326* (2013.01); *F15B 2211/6346* (2013.01); *F15B 2211/781* (2013.01)

(56) References Cited

U.S. PATENT DOCUMENTS

| | | | | |
|---|---|---|---|---|
| 9,200,646 | B2 * | 12/2015 | Weickert ............... | E02F 9/2228 |
| 9,303,387 | B2 * | 4/2016 | Pfaff ..................... | E02F 9/2228 |
| 11,261,582 | B1 * | 3/2022 | Andreuccetti ........ | F15B 11/165 |
| 11,268,545 | B2 * | 3/2022 | Szeles ................... | F15B 11/162 |
| 2014/0069091 | A1 * | 3/2014 | Franzoni ............... | F15B 13/022<br>60/429 |
| 2022/0098833 | A1 | 3/2022 | Fukuda | |
| 2023/0160179 | A1 | 5/2023 | Fukuda | |

* cited by examiner

HYDRAULIC SYSTEM FOR WORKING MACHINE

CROSS REFERENCE TO RELATED APPLICATIONS

This application claims the benefit of priority to Japanese Patent Application No. 2022-128313 filed on Aug. 10, 2022. The entire contents of this application are hereby incorporated herein by reference.

BACKGROUND OF THE INVENTION

1. Field of the Invention

The present invention relates to a hydraulic system for a working machine such as a skid-steer loader or a compact track loader.

2. Description of the Related Art

A working machine called a compact track loader as disclosed in, for example, Japanese Unexamined Patent Application Publication No. 2022-57494 is known as a working machine including hydraulic actuator(s). The working machine includes a pair of left and right lift arms. The lift arms are driven by lift arm cylinders as hydraulic actuators to swing upward and downward relative to the machine body.

For the cases where an attachment including hydraulic actuator(s) such as a sweeper is attached to the lift arms, one of the pair of left and right lift arms has outlet port(s) for hydraulic fluid (auxiliary (AUX) port(s)).

SUMMARY OF THE INVENTION

With regard to the working machine, there may be cases in which the lift arm cylinders and the hydraulic actuator of the attachment are actuated concurrently. If the sum of the required flow rate of the lift arm cylinders and the required flow rate of the hydraulic actuator of the attachment is greater than the maximum delivery flow rate of a shared hydraulic pump, both the flow rate of hydraulic fluid supplied to the lift arm cylinders and the flow rate of hydraulic fluid supplied to the hydraulic actuator of the attachment would decrease below the respective required flow rates, making it impossible to achieve work speed or work efficiency, etc. desired by the operator.

A hydraulic system for a working machine according to an aspect of a preferred embodiment of the present invention includes a hydraulic pump, a first hydraulic actuator to be actuated by hydraulic fluid delivered by the hydraulic pump, a second hydraulic actuator to be actuated by hydraulic fluid delivered by the hydraulic pump, a first manual operator to be operated to set a first required flow rate, a second manual operator to be operated to set a second required flow rate, a first flow rate controller to control a first supply flow rate which is a flow rate of hydraulic fluid supplied to the first hydraulic actuator such that the first supply flow rate matches the first required flow rate set by operating the first manual operator, a second flow rate controller to control a second supply flow rate which is a flow rate of hydraulic fluid supplied to the second hydraulic actuator such that the second supply flow rate matches the second required flow rate set by operating the second manual operator, and a special flow rate control system to, if it is determined that a total required flow rate which is a sum of the first required flow rate and the second required flow rate is greater than a maximum delivery flow rate which is a maximum flow rate of hydraulic fluid deliverable by the hydraulic pump, reduce the first supply flow rate to allow the second supply flow rate to approach the second required flow rate.

The special flow rate control system may, if it is determined that the total required flow rate is greater than the maximum delivery flow rate, set a limited required flow rate which is less than the first required flow rate and reduce the first supply flow rate to the limited required flow rate to allow the second supply flow rate to approach the second required flow rate.

The special flow rate control system may, if it is determined that the total required flow rate is greater than the maximum delivery flow rate, set a limited required flow rate which is equal to or less than a difference between the maximum delivery flow rate and the second required flow rate and reduce the first supply flow rate to the limited required flow rate to allow the second supply flow rate to approach the second required flow rate.

The special flow rate control system may, if it is determined that the total required flow rate is greater than the maximum delivery flow rate when the second required flow rate is set after the first required flow rate is set, reduce the first supply flow rate to allow the second supply flow rate to approach the second required flow rate.

The special flow rate control system may, if it is determined that the total required flow rate is greater than the maximum delivery flow rate, gradually reduce the first supply flow rate to allow the second supply flow rate to approach the second required flow rate.

The special flow rate control system may, if it is determined that the total required flow rate is greater than the maximum delivery flow rate, gradually reduce the first supply flow rate at a constant rate to allow the second supply flow rate to approach the second required flow rate.

The special flow rate control system may, if it is determined that the total required flow rate is greater than the maximum delivery flow rate, reduce the first supply flow rate stepwise to allow the second supply flow rate to approach the second required flow rate.

The special flow rate control system may, if it is determined that the total required flow rate which was greater than the maximum delivery flow rate has decreased to the maximum delivery flow rate or less due to operation of the first manual operator or the second manual operator, increase the reduced first supply flow rate to allow the first supply flow rate to approach the first required flow rate.

The hydraulic system may further include a pump controller to control a flow rate of hydraulic fluid delivered by the hydraulic pump. The pump controller may control the hydraulic pump such that a delivery pressure which is a pressure of hydraulic fluid delivered by the hydraulic pump is greater than a greatest one of load pressures of the first hydraulic actuator and the second hydraulic actuator by a predetermined load sensing differential pressure.

The hydraulic system may further include a pressure compensating valve to keep a hydraulic pressure set for hydraulic fluid supplied to the first hydraulic actuator.

The hydraulic system may further include a fluid discharge passage to allow hydraulic fluid delivered by the hydraulic pump to flow therein, a first branch fluid passage branching from the fluid discharge passage, a first control valve to allow hydraulic fluid supplied through the first branch fluid passage from the fluid discharge passage to be supplied to the first hydraulic actuator, a second branch fluid passage branching from the fluid discharge passage and parallel to the first branch fluid passage, and a second control valve to allow hydraulic fluid supplied through the second branch fluid passage from the fluid discharge passage to be supplied to the second hydraulic actuator. The first flow rate controller may control a position of the first control valve such that the first supply flow rate matches the first required flow rate. The second flow rate controller may control a position of the second control valve such that the second supply flow rate matches the second required flow rate. The special flow rate control system may, if it is determined that the total required flow rate is greater than the maximum delivery flow rate, allow the second supply flow rate to approach the second required flow rate by causing the first flow rate controller to change the position of the first control valve to reduce the first supply flow rate while causing the second flow rate controller to hold the second control valve in a position that allows the second supply flow rate to match the second required flow rate.

A position of the first control valve may be controlled by pilot pressure fluid. The first flow rate controller may control a supply of the pilot pressure fluid to the first control valve.

The hydraulic system may further include a solenoid valve to supply the pilot pressure fluid to the first control valve. The first flow rate controller may output a control signal to control an opening of the solenoid valve.

The first control valve may be a solenoid valve. The first flow rate controller may output, to the first control valve, a control signal to control energization of a solenoid of the solenoid valve.

The special flow rate control system may include a variable throttle provided in a fluid passage to allow hydraulic fluid supplied to the first hydraulic actuator to flow therein.

The special flow rate control system may, if it is determined that the total required flow rate is greater than the maximum delivery flow rate, cause the first flow rate controller to increase a degree of closing of the variable throttle to reduce the first supply flow rate to allow the second supply flow rate to approach the second required flow rate.

The hydraulic system may further include a fluid discharge passage to allow hydraulic fluid delivered by the hydraulic pump to flow therein, a first branch fluid passage branching from the fluid discharge passage, a first control valve to allow hydraulic fluid supplied through the first branch fluid passage from the fluid discharge passage to be supplied to the first hydraulic actuator, a second branch fluid passage branching from the fluid discharge passage and parallel to the first branch fluid passage, and a second control valve to allow hydraulic fluid supplied through the second branch fluid passage from the fluid discharge passage to be supplied to the second hydraulic actuator. The first flow rate controller may control a position of the first control valve such that the first supply flow rate matches the first required flow rate. The second flow rate controller may control a position of the second control valve such that the second supply flow rate matches the second required flow rate. The special flow rate control system may, if it is determined that the total required flow rate is greater than the maximum delivery flow rate, while causing the second flow rate controller to hold the second control valve in a position that allows the second supply flow rate to match the second required flow rate and causing the first flow rate controller to hold the first control valve in a position that allows the first supply flow rate to match the first required flow rate, increase the degree of closing of the variable throttle to reduce the first supply flow rate to allow the second supply flow rate to approach the second required flow rate.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
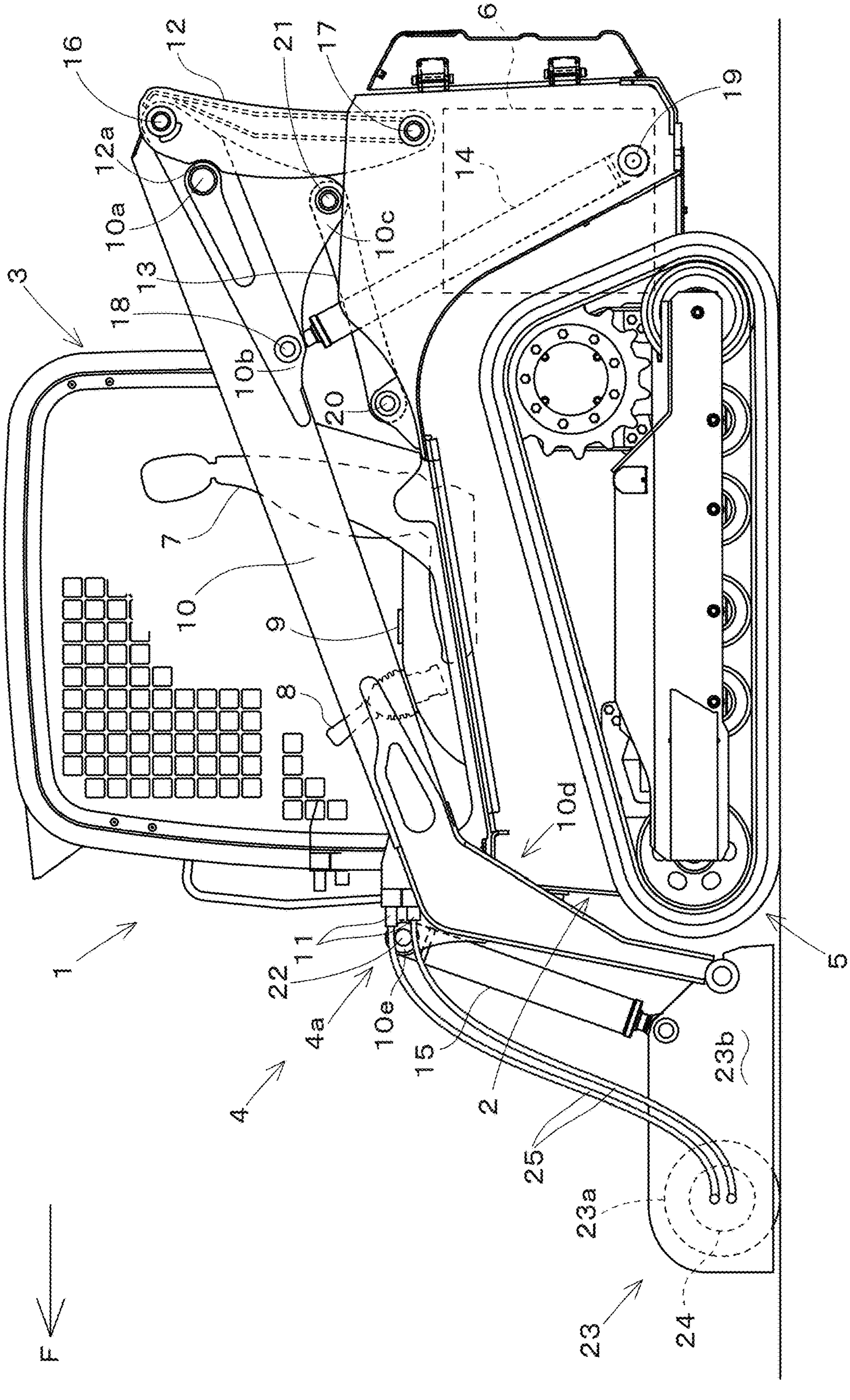
FIG. 1 is a side view of a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses preferred embodiments of hydraulic systems for working machines according to the present invention with reference to drawings as necessary.

The following schematically describes a general configuration of a working machine according to preferred embodiments of the present invention with reference to FIG. 1. In the present preferred embodiment, the working machine is a compact track loader (CTL) 1. Examples of a working machine to which a hydraulic system according to preferred embodiments of the present invention is applicable include tractors, skid-steer loaders, and backhoes in addition to compact track loaders.

The CTL 1 includes a machine body 2, a cabin 3, a working device 4, and traveling device(s) 5. The machine body 2 is provided with the cabin 3, the working device 4, and the traveling device(s) 5. In the following description, the direction indicated by arrow F in FIG. 1 is referred to as a forward direction, the direction opposite to the forward direction is referred to as a rearward direction, the leftward direction when the CTL 1 is viewed from behind along arrow F is referred to as a leftward direction, and the rightward direction when the CTL 1 is viewed from behind along arrow F is referred to as a rightward direction.

The CTL 1 according to the present preferred embodiment is a track loader which includes a pair of the left and right crawler traveling devices 5 provided at left and right portions of the machine body 2. Note that the traveling devices are not limited to crawler traveling devices. For example, the working machine may be a wheel loader including a wheeled traveling device including front and rear wheels.

The machine body 2 is provided with a prime mover 6 at, for example, a position rearward of the cabin 3. The prime mover 6 may be an internal-combustion engine, an electric motor, and/or the like. The pair of left and right traveling devices 5 are driven by power from the prime mover 6.

Specifically, the pair of left and right traveling devices 5 each include a travel hydraulic actuator such as a hydraulic motor, and hydraulic fluid delivered by hydraulic pump(s) driven by power from the prime mover 6 is supplied to the travel hydraulic actuators, thus actuating the travel hydraulic actuators to drive, for example, the driving wheels of the traveling devices 5.

With regard to the hydraulic pump(s) to supply hydraulic fluid to the travel hydraulic actuators, for example, a pair of hydraulic pumps may be fluidly connected to their corresponding hydraulic motors to constitute a portion of a pair of hydraulic continuously variable transmissions (hydrostatic transmissions (HSTs)) to drive the respective traveling devices 5.

Note that the manner in which the traveling devices 5 of the CTL 1 according to the present preferred embodiment are driven is not limited to the above-described manner. For example, the machine body 2 may be provided with a battery instead of the prime mover 6, the left and right traveling devices 5 may include respective electric motors, and the electric motors may be driven by electric current supplied from the battery.

The machine body 2 is provided with an operator's seat 7. The cabin 3 is provided on the machine body 2 such that the cabin 3 surrounds the operator's seat 7. The cabin 3 is a type of protection structure to protect the operator seated on the operator's seat 7, instruments and operation members (manual operators) such as levers and switches located in the vicinity of the operator's seat 7, and the like. A protection structure having the same function, such as a canopy or a ROPS, may be provided on the machine body 2.

The cabin 3 has housed therein a work operation lever 8 which is a type of operation member to be manually operated by the operator seated on the operator's seat 7. The work operation lever 8 is operated to cause a pair of left and right lift arms 10 (described later) of the working device 4 to swing up or down or cause an attachment (described later) to pivot up or down (specifically, the work operation lever 8 is operated to control the extension/retraction movements of a pair of left and right lift arm cylinders 14 (described later) and the extension/retraction movements of a pair of left and right attachment cylinders 15 (described later)).

Figure 2:
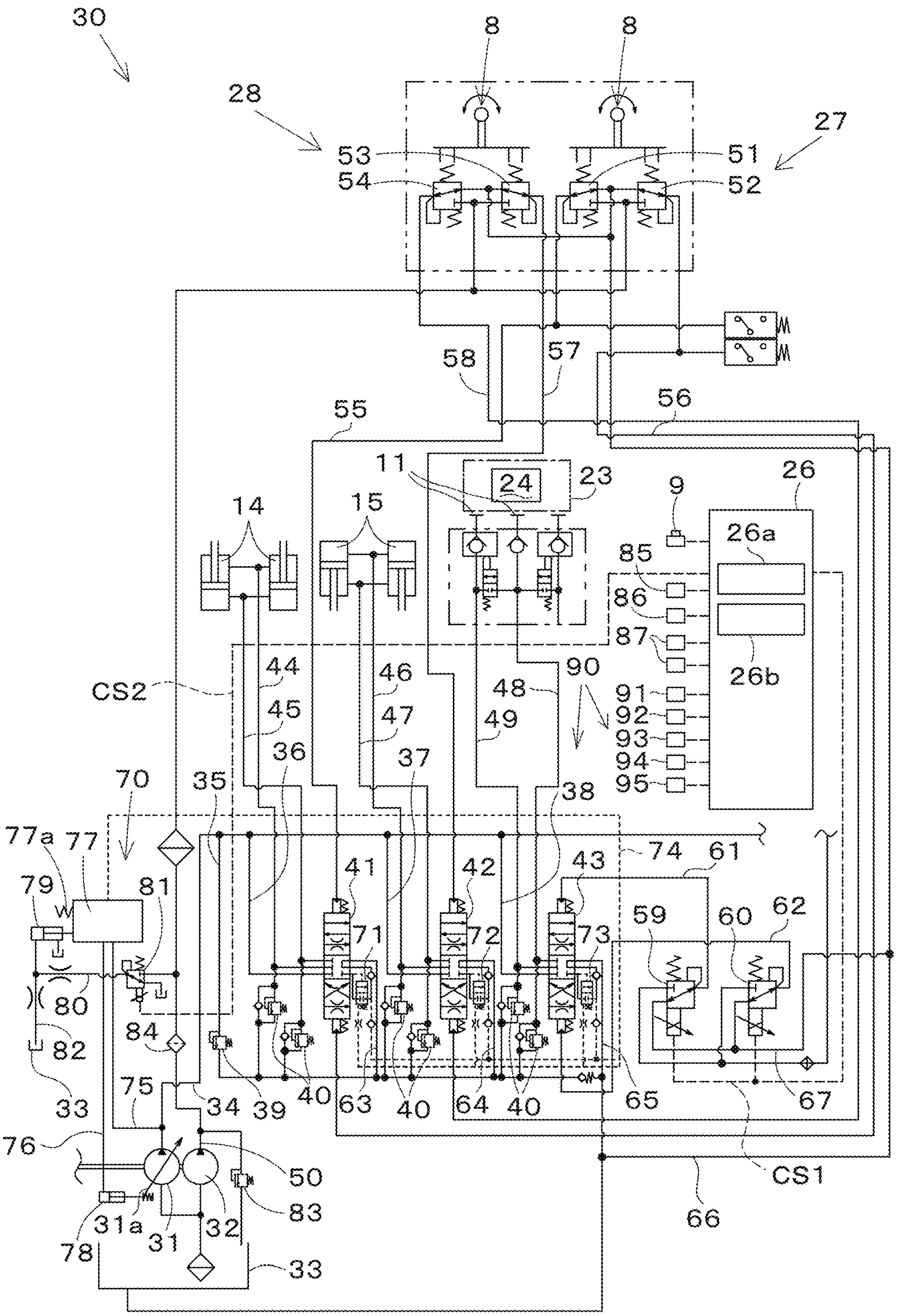
FIG. 2 is a circuit diagram of a hydraulic system for a working machine according to a first preferred embodiment of the present invention.

Referring to FIG. 2, in the cabin 3, an auxiliary drive switch (AUX operation switch) 9 is provided in the vicinity of the operator's seat 7. The AUX operation switch 9 is operated to control the supply of hydraulic fluid to a hydraulic actuator (for example, a hydraulic motor 24 (described later)) of an attachment (for example, a sweeper 23 (described later)) attached to the working device 4.

The working device 4 includes the pair of left and right lift arms 10 attached to the machine body 2 such that the lift arms 10 are swingable up and down. The left one of the pair of left and right lift arms 10 is located leftward of the cabin 3, and the right one of the pair of left and right lift arms 10 is located rightward of the cabin 3. Each of the lift arms 10 is positioned such that the length thereof extends along a front-rear direction of the CTL 1.

Front portions of the left and right lift arms 10 are connected to each other via a connector (not illustrated) at a position forward of the cabin 3. Rear portions of the left and right lift arms 10 are connected to each other via a connector (not illustrated) at a position rearward of the cabin 3.

The assembly of the left and right lift arms 10 and the front and rear connectors (not illustrated) defines a main body **4*a* of the working device 4, and is attached to the machine body 2** and swingable up and down.

Note that the manner in which the left and right lift arms 10 are connected is not limited to using the front and rear connectors as described above, and may be any manner, provided that the assembly of the left and right lift arms 10 is swingable up and down relative to the machine body 2.

The working device 4 includes a pair of left and right lift links 12 and a pair of left and right control links 13 to support the main body **4*a* including the left and right lift arms 10 on a rear portion of the machine body 2**.

The working device 4 includes the pair of left and right lift arm cylinders 14 as hydraulic actuators to cause the main body **4*a* including the left and right lift arms 10 to swing up and down relative to the machine body 2**.

FIG. 1 is a left side view of the CTL 1, and illustrates the left lift arm 10, the left lift link 12, the left control link 13, and the left lift arm cylinder 14 which are located leftward of the cabin 3. Similarly, the right lift arm 10, the right lift link 12, the right control link 13, and the right lift arm cylinder 14 are located rightward of the cabin 3, which are not illustrated in FIG. 1.

Note that, in FIG. 1, the left and right lift arms 10 (the main body **4*a* of the working device 4 including the left and right lift arms 10) swingable up and down relative to the machine body 2 is in its fully lowered position in an up-and-down swing direction. In the following description, the positions and orientations of elements of the working device 4 are discussed based on the assumption that the left and right lift arms 10** are in the fully lowered position.

Each of the lift links 12 extends substantially vertically, the top end of the lift link 12 is pivotally connected to the rear end of a corresponding lift arm 10 via a pivot shaft 16 having a lateral axis, and the lower end of the lift link 12 is pivotally connected to an upper rear portion of the machine body 2 via a pivot shaft 17 having a lateral axis.

Note that each of the lift links 12 has a recess **12*a* in its front edge. As illustrated in FIG. 1, when the recess 12*a* receives a stopper 10*a* on a side surface of a corresponding lift arm 10, the lift arm 10 can no longer swing in a direction approaching the lift link 12 about the pivot shaft 16. That is, when the stopper 10*a* is fitted in the recess 12*a*, the angle between the lift arm 10 and the lift link 12 at the pivot shaft 16** is minimum.

Each of the lift arms 10 is provided with a bracket **10*b* at a rear portion thereof. The bracket 10*b* is located forward of a corresponding pivot shaft 16. The bracket 10*b* has pivotally connected thereto the distal end of the piston rod of a corresponding lift arm cylinder 14 via a pivot shaft 18 having a lateral axis. The bottom end of the lift arm cylinder 14 is pivotally connected to a lower rear portion of the machine body 2 via a pivot shaft 19 having a lateral axis at a location below a corresponding pivot shaft 17**.

The lift arm cylinders 14 house respective pistons, and are configured to extend and retract their piston rods by moving the pistons by hydraulic pressure. The piston rods in the lift arm cylinders 14 illustrated in FIG. 1 are in their fully retracted position. That is, the left and right lift arms 10 are in the fully lowered position when the stoppers **10*a* are fitted in the recesses 12***a*, the angle between the lift arms 10 and the lift links 12 is minimum, and the lift arm cylinders 14 are fully retracted.

Each of the lift arms 10 is provided, at a rear portion thereof, with a bracket 10*c* projecting downward. The bracket 10*c* is located between a corresponding pivot shaft 16 and a corresponding pivot shaft 18 in the front-rear direction. Each of the control links 13 extends substantially in the front-rear direction, the front end of the control link 13 is pivotally connected to the portion of the upper rear portion of the machine body 2 that is located forward of a corresponding pivot shaft 16 via a pivot shaft 20 having a lateral axis, and the rear end of the control link 13 is pivotally connected to a corresponding bracket 10*c* via a pivot shaft 21 having a lateral axis.

When the left and right lift arms 10 are in the fully lowered position as illustrated in FIG. 1, upon upward extension of the piston rods of the left and right lift arm cylinders 14, the piston rods raise the brackets 10*b* of the lift arms 10.

As described earlier, the rear ends of the lift arms 10 and the top ends of the lift links 12 are pivotally connected to each other via the pivot shafts 16 at a position rearward of the brackets 10*b*. The rear ends of the lift arms 10 and the top ends of the lift links 12 pivot diagonally rearward and downward about the pivot shafts 17 with the angle between the lift arms 10 and the lift links 12 kept at minimum (that is, with the stoppers 10*a* fitted in the recesses 12*a*) as the brackets 10*b* are raised. Accordingly, the front ends of the lift arms 10 ascend from the fully lowered position.

When the piston rods of the left and right lift arm cylinders 14 further extend upward, the brackets 10*b* are further raised with the left and right lift links 12 kept inclined diagonally rearward and upward, and eventually, the stoppers 10*a* come off the recesses 12*a* and the lift arms 10 pivot about the pivot shafts 16 such that the angle between the lift arms 10 and the lift links 12 increases. Accordingly, the control links 13 pivot diagonally forward and upward about the pivot shafts 20 to allow the front ends of the lift arms 10 to further move upward.

When the control links 13 pivot diagonally forward and upward and the pivot shafts 21 reach the fully raised position within their reachable range in the vertical direction, the left and right lift arms 10 (the main body 4*a* of the working device 4) can no longer be raised. That is, when the pivot shafts 21 reach such a position, the left and right lift arms 10 (the main body 4*a* of the working device 4) reach the fully raised position and the lift arm cylinders 14 are fully extended.

Each of the lift arms 10 extends forward from a corresponding bracket 10*b* (when the lift arms 10 are in the fully lowered position, each of the lift arms 10 extends diagonally forward and downward), includes a bent portion 10*d* located forward of the cabin 3, and extends downward from the bent portion 10*d* to the front end thereof. The front ends of the left and right lift arms 10 are configured to have an attachment for work connected thereto.

The working device 4 includes the pair of left and right attachment cylinders 15. The attachment cylinders 15 are hydraulic actuators to support the attachment attached to the left and right lift arms 10 and cause the attachment to pivot upward and downward relative to the lift arms 10.

Each of the lift arms 10 is provided with a bracket 10*e* at the bent portion 10*d*. The cylinder bottom (upper end) of a corresponding one of the pair of left and right attachment cylinders 15 is pivotally connected to the bracket 10*e* via a pivot shaft 22 having a lateral axis. The distal end (lower end) of the piston rod of the attachment cylinder 15 is pivotally connected to the attachment attached to the front ends of the left and right lift arms 10.

One of the pair of left and right lift arms 10 (in the present preferred embodiment, the left one of the pair of left and right lift arms 10) is provided, at the bent portion 10*d* thereof, with one or more AUX ports (one or more hydraulic fluid outlet ports) 11. The one or more AUX ports 11 are one or more couplers, which allow the connection end(s) of fluid tube(s) such as hose(s) to be connected to a hydraulic actuator (AUX actuator) of the attachment attached to the front ends of the left and right lift arms 10.

The working device 4 is configured to have various attachments attached thereto. Such attachments are connectable to at least the front ends of the left and right lift arms 10. That is, the attachment can be attached to the working device 4 by attaching the attachment to the front ends of both the left and right lift arms 10.

Examples of various attachments attachable to the working device 4 (connectable to the left and right lift arms 10) include buckets, hydraulic crushers, hydraulic breakers, angle brooms, earth augers, pallet forks, sweepers, mowers, and snow blowers. FIG. 1 illustrates a preferred embodiment in which a sweeper 23 is attached to the working device 4 of the CTL 1.

The sweeper 23 includes a rotary brush 23*a* having a lateral rotation shaft, a sweeper cover 23*b* to cover the rotary brush 23*a* and support the rotation shaft of the rotary brush 23*a*, and a hydraulic motor 24 which is a hydraulic actuator (AUX actuator) to drive the rotation shaft of the rotary brush 23*a*.

The sweeper 23 is configured such that a lower rear portion of the sweeper cover 23*b* is pivotally connected to the front ends of both the left and right lift arms 10, and an upper rear portion of the sweeper cover 23*b* is pivotally connected to the distal ends (lower ends) of the piston rods of both the left and right attachment cylinders 15, so that the sweeper 23 is supported on the main body 4*a* of the working device 4 including the left and right lift arms 10 such that the sweeper 23 is swingable up and down.

The sweeper 23 is provided with hydraulic fluid tube(s) 25 for supply of hydraulic fluid to the hydraulic motor 24. The hydraulic fluid tube(s) 25 have/has coupler(s) at the top end(s) which is/are connected to the AUX port(s) 11 of the bent portion 10*d* of one of the lift arms 10.

This allows hydraulic fluid to flow, from a hydraulic circuit provided in the machine body 2 to supply hydraulic fluid to the lift arm cylinders 14, the attachment cylinders 15, and the like, to the hydraulic motor 24 of the sweeper 23 attached to the working device 4.

The following description discusses a hydraulic system 30 of the CTL 1 to control hydraulic actuators of the working device 4 and the attachment (in the present preferred embodiment, the sweeper 23) attached to the working device 4 with reference to the hydraulic circuit diagram in FIG. 2.

As illustrated in FIG. 2, the hydraulic system 30 includes hydraulic pumps 31 and 32. The hydraulic pumps 31 and 32 are both driven by power from the prime mover 6, suck fluid stored in the same reservoir tank 33, and deliver fluid from their respective delivery ports.

The hydraulic pump 31 is a variable displacement pump. In the present preferred embodiment, an axial piston pump with a movable swash plate is used as the hydraulic pump 31, but the hydraulic pump 31 may be a pump of some other structure, provided that the hydraulic pump 31 is a variable displacement pump.

The hydraulic pump 31 of the present preferred embodiment includes a movable swash plate 31*a*, and is configured to change the flow rate of delivered fluid (delivery flow rate D) by changing the angle of inclination of the movable swash plate 31*a*. The delivery flow rate D of the hydraulic pump 31 can be changed also by changing the rotation speed of the prime mover 6.

The hydraulic pump 32 is a fixed displacement pump, and is typically a gear pump. Note that the flow rate of fluid delivered by the hydraulic pump 32 (delivery flow rate) can be changed by changing the rotation speed at the output of the prime mover 6.

Note that the hydraulic fluid delivered by the hydraulic pump 32 may be supplied also to hydraulic actuators of the working device 4, i.e., a pair of travel hydraulic actuators of the pair of left and right crawler traveling devices 5 (such as HSTs), although such a configuration is not illustrated in FIG. 2.

The hydraulic pump 31 delivers hydraulic fluid which is to be supplied to hydraulic actuators of the working device 4 of the CTL 1 (i.e., the pair of left and right lift arm cylinders 14 and the pair of left and right attachment cylinders 15) and to a hydraulic actuator of the attachment attached to the working device 4 (in the present preferred embodiment, the hydraulic motor 24 of the sweeper 23).

The machine body 2 includes control valves to control supply of hydraulic fluid to hydraulic actuators. FIG. 2 illustrates a lift arm control valve 41 to control the flow of hydraulic fluid supplied to the left and right lift arm cylinders 14, an attachment control valve 42 to control the flow of hydraulic fluid supplied to the left and right attachment cylinders 15, and an AUX control valve 43 to control the flow of hydraulic fluid supplied to the AUX port(s) 11, of the above-mentioned control valves.

A fluid discharge passage 34 extends from a delivery port of the hydraulic pump 31. A branch fluid passage 36 branching from the fluid discharge passage 34 is connected to a pump port of the lift arm control valve 41. A branch fluid passage 37 branching from the fluid discharge passage 34 at a point downstream of the point at which the branch fluid passage 36 branches off is connected to a pump port of the attachment control valve 42. A branch fluid passage 38 branching from the fluid discharge passage 34 at a point downstream of the point at which the branch fluid passage 37 branches off is connected to a pump port of the AUX control valve 43. That is, the control valves 41, 42, and 43 are connected to the fluid discharge passage 34 in parallel to each other via the respective branch fluid passages 36, 37, and 38.

Each of the lift arm cylinders 14 is a double-acting hydraulic cylinder, and has an interior separated by the piston into a bottom-side (lower) fluid chamber and a rod-side (upper) fluid chamber. Fluid supply/discharge passages 44 and 45 extend from the lift arm control valve 41, the fluid supply/discharge passage 44 is in communication with the rod-side fluid chambers of both the left and right lift arm cylinders 14, and the fluid supply/discharge passage 45 is in communication with the bottom-side fluid chambers of both the left and right lift arm cylinders 14.

Each of the attachment cylinders 15 is a double-acting hydraulic cylinder, and has an interior separated by the piston into a rod-side (lower) fluid chamber and a bottom-side (upper) fluid chamber. Fluid supply/discharge passages 46 and 47 extend from the attachment control valve 42, the fluid supply/discharge passage 46 is in communication with the bottom-side fluid chambers of both the left and right attachment cylinders 15, and the fluid supply/discharge passage 47 is in communication with the rod-side fluid chambers of both the left and right attachment cylinders 15.

Fluid supply/discharge passages 48 and 49 extend from the AUX control valve 43, and are connected to respective corresponding AUX ports 11. The AUX ports 11 have fluidly coupled thereto the hydraulic motor 24 (hydraulic actuator) of the sweeper 23 (attachment) via the hydraulic fluid tubes 25 (see FIG. 1).

Note that, in the following description about the hydraulic system 30, the term "lift arms 10" refers to "the pair of left and right lift arms 10", the term "lift arm cylinders 14" refers to "the pair of left and right lift arm cylinders 14", and the term "attachment cylinders 15" refers to "the pair of left and right attachment cylinders 15".

The control valves 41, 42, and 43 are direction switching valves controlled by pilot pressure, including a spool and pressure receivers provided at opposite ends of the spool to receive pilot pressure. The hydraulic pump 32 is a pilot pressure pump to supply pilot pressure fluid to the control valves 41 and 42.

The work operation lever 8 illustrated in FIGS. 1 and 2 is to be manually pivoted along the front-rear direction by the operator seated on the operator's seat 7 to cause the lift arms 10 to swing up or down (raised or lowered) relative to the machine body 2, and is to be manually pivoted by the operator leftward or rightward to cause the attachment (the sweeper 23 in the present preferred embodiment) to pivot upward or downward relative to the lift arms 10.

In the CTL 1, operation valves 51, 52, 53, and 54 are provided in the vicinity of the base portion of the work operation lever 8. A fluid discharge passage 50 extends from a delivery port of the hydraulic pump 32 and is connected to the operation valves 51, 52, 53, and 54.

The operation valves 51, 52, 53, and 54 are actuated by pivoting the work operation lever 8 to deliver, as pilot pressure fluid, fluid supplied from the hydraulic pump 32 through the fluid discharge passage 50.

Upon forward pivoting of the work operation lever 8 from the neutral position, the operation valve 51 delivers pilot pressure fluid in an amount corresponding to the angle of inclination (operation amount) from the neutral position. The pilot pressure fluid passes through a pilot fluid passage 55 and is supplied to the upper pressure receiver of the lift arm control valve 41 in FIG. 2, allowing the spool of the lift arm control valve 41 to move downward in FIG. 2.

With this, hydraulic fluid is supplied to the rod-side fluid chambers of the lift arm cylinders 14 through the fluid supply/discharge passage 44 from the lift arm control valve 41, hydraulic fluid is discharged to the lift arm control valve 41 through the fluid supply/discharge passage 45 from the bottom-side fluid chambers of the lift arm cylinders 14, the lift arm cylinders 14 retract, and the lift arms 10 descend.

Upon rearward pivoting of the work operation lever 8 from the neutral position, the operation valve 52 delivers pilot pressure fluid in an amount corresponding to the angle of inclination (operation amount) from the neutral position. The pilot pressure fluid passes through a pilot fluid passage 56 and is supplied to the lower pressure receiver of the lift arm control valve 41 in FIG. 2, allowing the spool of the lift arm control valve 41 to move upward in FIG. 2.

With this, hydraulic fluid is supplied to the bottom-side fluid chambers of the lift arm cylinders 14 through the fluid supply/discharge passage 45 from the lift arm control valve 41, hydraulic fluid is discharged to the lift arm control valve 41 through the fluid supply/discharge passage 44 from the rod-side fluid chambers of the lift arm cylinders 14, the lift arm cylinders 14 extend, and the lift arms 10 ascend.

It is noted here that the speed of raising and lowering of the lift arms 10 is determined by the flow rate of hydraulic fluid supplied from the lift arm control valve 41 to the lift arm cylinders 14 (the flow rate of hydraulic fluid flowing through the fluid supply/discharge passages 44 and 45). The angle of inclination, i.e., operation amount, of the work operation lever 8 along the front-rear direction defines a set value of the flow rate of hydraulic fluid supplied to the lift arm cylinders 14, i.e., the required flow rate of hydraulic fluid supplied to the lift arm cylinders 14.

The operation valves 51 and 52 are actuated by forward or rearward pivoting of the work operation lever 8. Pilot pressure fluid is delivered by the operation valve(s) 51 and/or 52 to the lift arm control valve 41 such that the flow rate (actual flow rate) of hydraulic fluid supplied from the lift arm control valve 41 to the lift arm cylinders 14 is the required flow rate.

That is, the operation valves 51 and 52 are a portion of a flow rate controller 27 to control the position of the lift arm control valve 41 such that the flow rate of hydraulic fluid supplied to the lift arm cylinders 14 matches the required flow rate for the lift arm cylinders 14 set by pivoting the work operation lever 8 forward or rearward.

Upon leftward pivoting of the work operation lever 8 from the neutral position, the operation valve 53 delivers pilot pressure fluid in an amount corresponding to the angle of inclination (operation amount) from the neutral position. The pilot pressure fluid passes through a pilot fluid passage 57 and is supplied to the upper pressure receiver of the attachment control valve 42 in FIG. 2, allowing the spool of the attachment control valve 42 to move downward in FIG. 2.

With this, hydraulic fluid is supplied to the bottom-side fluid chambers of the attachment cylinders 15 through the fluid supply/discharge passage 46 from the attachment control valve 42, hydraulic fluid is discharged to the attachment control valve 42 through the fluid supply/discharge passage 47 from the rod-side fluid chambers of the attachment cylinders 15, the attachment cylinders 15 extend, and the attachment (the sweeper 23 in the present preferred embodiment) pivots downward relative to the lift arms 10.

Upon rightward pivoting of the work operation lever 8 from the neutral position, the operation valve 54 delivers pilot pressure fluid in an amount corresponding to the angle of inclination (operation amount) from the neutral position. The pilot pressure fluid passes through a pilot fluid passage 58 and is supplied to the lower pressure receiver of the attachment control valve 42 in FIG. 2, allowing the spool of the attachment control valve 42 to move upward in FIG. 2.

With this, hydraulic fluid is supplied to the rod-side fluid chambers of the attachment cylinders 15 through the fluid supply/discharge passage 47 from the attachment control valve 42, hydraulic fluid is discharged to the attachment control valve 42 through the fluid supply/discharge passage 46 from the bottom-side fluid chambers of the attachment cylinders 15, the attachment cylinders 15 retract, and the attachment (the sweeper 23 in the present preferred embodiment) pivots upward relative to the lift arms 10.

It is noted here that the speed of upward and downward pivoting of the attachment relative to the lift arms 10 is determined by the flow rate of hydraulic fluid supplied from the attachment control valve 42 to the attachment cylinders 15 (the flow rate of hydraulic fluid flowing through the fluid supply/discharge passages 46 and 47). The angle of inclination, i.e., operation amount, of the work operation lever 8 along the lateral direction defines a set value of the flow rate of hydraulic fluid supplied to the attachment cylinders 15, i.e., the required flow rate of hydraulic fluid supplied to the attachment cylinders 15.

The operation valves 53 and 54 are actuated by leftward or rightward pivoting of the work operation lever 8. Pilot pressure fluid is delivered by the operation valve(s) 53 and/or 54 to the attachment control valve 42 such that the flow rate (actual flow rate) of hydraulic fluid supplied from the attachment control valve 42 to the attachment cylinders 15 is the required flow rate.

That is, the operation valves 53 and 54 are a portion of a flow rate controller 28 to control the position of the attachment control valve 42 such that the flow rate of hydraulic fluid supplied to the attachment cylinders 15 matches the required flow rate for the attachment cylinders 15 set by pivoting the work operation lever 8 leftward or rightward.

Note that the work operation lever 8 may be pivoted diagonally from the neutral position. The work operation lever 8 may be pivoted diagonally to raise or lower the lift arms 10 and cause the attachment (sweeper 23) to pivot upward or downward concurrently.

In such a case, for example, the hydraulic system 30 may be configured such that the lift arms 10 are lowered while the attachment is pivoted downward by pivoting the work operation lever 8 diagonally forward and leftward from the neutral position, the lift arms 10 are lowered while the attachment is pivoted upward by pivoting the work operation lever 8 diagonally forward and rightward from the neutral position, the lift arms 10 are raised while the attachment is pivoted downward by pivoting the work operation lever 8 diagonally rearward and leftward from the neutral position, and the lift arms 10 are raised while the attachment is pivoted upward by pivoting the work operation lever 8 diagonally rearward and rightward from the neutral position.

As illustrated in FIG. 2, the hydraulic motor 24 of the sweeper 23 as an attachment attached to the working device 4 in the present preferred embodiment is fluidly connected to the AUX ports 11 via the hydraulic fluid tubes 25 or the like (see FIG. 1).

As described earlier, the AUX operation switch 9 provided in the vicinity of the operator's seat 7 can be operated to control whether or not to supply hydraulic fluid to the hydraulic motor 24 (hydraulic actuator) of the sweeper 23 (attachment), the flow rate and direction of the flow of hydraulic fluid supplied to the hydraulic motor 24 (hydraulic actuator), and/or the like.

The hydraulic system 30 includes solenoid valves 59 and 60 to control the position of the AUX control valve 43. The solenoid valves 59 and 60 are controlled by a controller (flow rate controller) 26 based on the operation of the AUX operation switch 9.

The AUX operation switch 9 includes, for example, a swingable seesaw switch, a slidable switch, or a push switch. The controller 26 includes, for example, electric/electronic circuit(s) including CPU, MPU, one or more memories, and/or the like.

The AUX operation switch 9 is electrically connected to input interface(s) of the controller 26. Upon operation of the AUX operation switch 9, an input signal which is an electric signal corresponding to the operation direction and the operation amount is outputted from the AUX operation switch 9 and inputted into the controller 26.

For example, in the case where the AUX operation switch 9 is a slidable switch, an input signal corresponding to the direction in which the AUX operation switch 9 is slid (operation direction) and the degree to which the AUX operation switch 9 is slid (operation amount) is inputted into the controller 26.

The solenoid valve 59 and the solenoid valve 60 are electrically connected to output interface(s) of the controller 26. The controller 26 outputs, to the solenoid valves 59 and 60, electric current as a control signal CS1 in response to the electric signal from the AUX operation switch 9. Note that the term "solenoid valves 59 and 60" refers to "solenoid valve 59 and/or the solenoid valve 60", unless otherwise specified.

The solenoid valves 59 and 60 receive, for example, hydraulic fluid delivered by the hydraulic pump 31 through the fluid discharge passage 34, as fluid functioning as pilot pressure fluid supplied to the AUX control valve 43.

The solenoid valves 59 and 60 are initially in their closed state. The solenoid valves 59 and 60 open as their solenoids are energized by the control signal CS1 outputted from the controller 26, thus delivering the supplied fluid as pilot pressure fluid to the AUX control valve 43.

To which of the solenoid valves 59 and 60 the control signal CS1 is outputted from the controller 26 (or the control signal CS1 is not outputted to the solenoid valve 59 or 60) is determined by whether the AUX operation switch 9 is ON or OFF, in which direction the AUX operation switch 9 is operated, and the like.

The control signal CS1 is configured such that the degree of opening of a pilot pressure fluid outlet port of each of the solenoid valves 59 and 60 that is connected to the AUX control valve 43 corresponds to the operation amount of the AUX operation switch 9.

Upon receipt of the control signal CS1, the solenoid valve 59 supplies pilot pressure fluid to the upper pressure receiver of the AUX control valve 43 in FIG. 2 through a pilot fluid passage 61, so that the spool of the AUX control valve 43 is moved downward in FIG. 2.

With this, the AUX control valve 43 supplies hydraulic fluid to the hydraulic motor 24 (hydraulic actuator) of the sweeper 23 (attachment) through the fluid supply/discharge passage 48 and an AUX port 11 (corresponding one of the AUX ports 11, which may hereinafter by referred to as "an AUX port 11"), and the hydraulic motor 24 returns hydraulic fluid to the AUX control valve 43 through an AUX port 11 and the fluid supply/discharge passage 49. With this, the hydraulic motor 24 rotates in a first rotation direction and the rotary brush 23*a* rotates in a direction corresponding to the first rotation direction.

Upon receipt of the control signal CS1, the solenoid valve 60 supplies pilot pressure fluid to the lower pressure receiver of the AUX control valve 43 in FIG. 2 through a pilot fluid passage 62, so that the spool of the AUX control valve 43 is moved upward in FIG. 2.

With this, the AUX control valve 43 supplies hydraulic fluid to the hydraulic motor 24 (hydraulic actuator) of the sweeper 23 (attachment) through the fluid supply/discharge passage 49 and an AUX port 11, and the hydraulic motor 24 returns hydraulic fluid to the AUX control valve 43 through an AUX port 11 and the fluid supply/discharge passage 48. With this, the hydraulic motor 24 rotates in a second rotation direction opposite to the first rotation direction and the rotary brush 23*a* rotates in a direction corresponding to the second rotation direction.

It is noted there that the rotation speed of the hydraulic motor 24 is determined by the flow rate of hydraulic fluid supplied from the AUX control valve 43 to the hydraulic motor 24 (hydraulic fluid in the fluid supply/discharge passages 48 and 49). The operation amount of the AUX operation switch 9 defines a set value of the flow rate of hydraulic fluid supplied to the hydraulic motor 24, i.e., the required flow rate of hydraulic fluid supplied to the hydraulic motor 24.

Thus, the controller 26 reads the required flow rate from the input signal from the AUX operation switch 9, and outputs the control signal CS1 to the solenoid valve(s) 59 and/or 60 such that the flow rate (actual flow rate) of hydraulic fluid supplied from the AUX control valve 43 to the hydraulic motor 24 matches the required flow rate (set flow rate).

A bleed-off fluid passage 35 branches from the fluid discharge passage 34 at a point upstream of the point at which the branch fluid passage 36 branches off. The bleed-off fluid passage 35 is provided with a flow rate adjusting valve 39 to adjust the flow rate of hydraulic fluid delivered by the hydraulic pump 31 and flowing through the fluid discharge passage 34 before reaching the point at which the branch fluid passage 36 branches off to the lift arm control valve 41. The bleed-off fluid passage 35 extends to the reservoir tank 33, and fluid released from the flow rate adjusting valve 39 is collected in the reservoir tank 33 through the bleed-off fluid passage 35.

The bleed-off fluid passage 35 is connected to a drain fluid passage 63 extending from a tank port of the lift arm control valve 41, at a point downstream of the flow rate adjusting valve 39. The bleed-off fluid passage 35 is also connected to a drain fluid passage 64 extending from a tank port of the attachment control valve 42, at a point downstream of the junction with the drain fluid passage 63. The bleed-off fluid passage 35 is also connected to a drain fluid passage 65 extending from a tank port of the AUX control valve 43, at a point downstream of the junction with the drain fluid passage 64.

Note that flow rate adjusting valves 40 are provided between the bleed-off fluid passage 35 and fluid supply/discharge passages 44 to 49 which are provided between the control valves 41, 42 and 43 and the hydraulic actuators (lift arm cylinders 14, attachment cylinders 15, hydraulic motor 24). This adjusts the flow rate of hydraulic fluid to drive the hydraulic actuators which flows through the fluid supply/discharge passages 44 to 49.

Furthermore, a communication fluid passage 66 is provided between the operation valves 51 to 54 and a point downstream of the junction of the bleed-off fluid passage 35 and the drain fluid passage 65. This makes it possible to allow a flow of fluid in the bleed-off fluid passage 35 (which is the combination of fluid discharged from tank ports of the control valves 41, 42, and 43 and fluid released from the flow rate adjusting valves 39 and 40) to enter the operation valves 51 to 54 through the communication fluid passage 66, and also possible to allow fluid discharged from the operation valves 51 to 54 to merge with a flow of fluid in the bleed-off fluid passage 35 through the communication fluid passage 66.

Note that a communication fluid passage 67 is provided between the communication fluid passage 66 and the solenoid valves 59 and 60. This allows fluid to be discharged from the solenoid valves 59 and 60 to the communication fluid passage 66 through the communication fluid passage 67 and allows fluid to enter the solenoid valves 59 and 60 from the communication fluid passage 66.

The hydraulic system 30 includes a load sensing (LS) system 70 as a pump controller to control the delivery flow rate of the hydraulic pump 31 based on work performed by the CTL 1. More specifically, the LS system 70 sets a predetermined load sensing (LS) differential pressure (pressure difference), and controls the delivery flow rate of the hydraulic pump 31 such that the delivery pressure of the hydraulic pump 31 is higher than the greatest one of the load pressures of the work hydraulic actuators by the LS differential pressure.

The LS system 70 includes pressure compensating valves 71, 72, and 73, fluid passages 74, 75, and 76, a flow rate compensating valve 77, and a swash plate control actuator 78.

The pressure compensating valves 71, 72 and 73 are fluidly connected to the respective control valves 41, 42, and 43. The control valves 41, 42, and 43, while their connected hydraulic actuators are actuated, supply hydraulic fluid introduced from the fluid discharge passage 34 to the hydraulic actuators through the respective pressure compensating valves 71, 72, and 73.

As hydraulic fluid passes through the pressure compensating valves 71, 72, and 73, the greatest one of the load pressures of the hydraulic actuators is detected, and pilot pressure fluid corresponding to the detected pressure is guided to the flow rate compensating valve 77 through the fluid passage 74.

On the other hand, the fluid passage 75 branches from the fluid discharge passage 34 extending from the delivery port of the hydraulic pump 31 (specifically, branches from a point upstream of the point at which the bleed-off fluid passage 35 branches from the fluid discharge passage 34), and allows a portion of hydraulic fluid delivered by the hydraulic pump 31 to enter the flow rate compensating valve 77 through the fluid passage 75.

The flow rate compensating valve 77 is fluidly connected to the swash plate control actuator 78 via the fluid passage 76. The hydraulic pump 31 includes a movable swash plate 31*a*. The swash plate control actuator 78 is a hydraulic cylinder, and its piston rod is connected to the movable swash plate 31*a*. The extension and retraction of the piston rod change the angle of inclination of the movable swash plate 31*a*, thus changing the delivery flow rate D of the hydraulic pump 31.

The flow rate compensating valve 77 includes an LS differential pressure setting spring 77*a* (which may be hereinafter simply referred to as a "spring 77*a*") to bias the flow rate compensating valve 77 to an initial position (position that does not allow fluid to be supplied to the swash plate control actuator 78). The spring force of the spring 77*a* corresponds to a target load sensing (LS) differential pressure P0 set in the LS system 70.

The target LS differential pressure P0 is a target value of a differential pressure P3 between a highest load pressure P1 which is the greatest one of the load pressures applied to hydraulic fluid by the hydraulic actuators 14, 15, and 24 and a delivery pressure P2 of the hydraulic pump 31. In other words, the hydraulic system 30 is required to be always in a hydraulic state in which the delivery pressure P2 of the hydraulic pump 31 is higher than the highest load pressure P1 by the target LS differential pressure P0 (P2=P1+P0), and the LS system 70 always maintains such a required hydraulic state.

The flow rate compensating valve 77 is held in a position in which the spring force of the spring 77*a* (target LS differential pressure P0) and the differential pressure P3 between the pilot hydraulic pressure from the fluid passage 74 (that corresponds to the highest load pressure P1) and the hydraulic pressure in the fluid passage 75 (that corresponds to the delivery pressure P2) are balanced with each other, and supplies fluid in an amount corresponding to that position to the swash plate control actuator 78.

The swash plate control actuator 78 causes the piston rod to extend to a degree corresponding to the amount of fluid supplied from the flow rate compensating valve 77 to set the angle of inclination of the movable swash plate 31*a* at the angle corresponding to that degree. The hydraulic pump 31 delivers hydraulic fluid at the delivery flow rate D corresponding to the angle of inclination of the movable swash plate 31*a*.

When the highest load pressure P1 increases and the differential pressure P3 decreases, the flow rate compensating valve 77 is moved by the biasing force of the spring 77*a* greater than the differential pressure P3 in a direction that increases the amount of fluid supplied to the swash plate control actuator 78 to increase the angle of inclination of the movable swash plate 31*a* to increase the delivery flow rate D, thus increasing the delivery pressure P2. The angle of inclination of the movable swash plate 31*a* increases until the differential pressure P3 and the biasing force of the spring 77*a* are balanced, i.e., until the differential pressure P3 reaches the target LS differential pressure P0.

When the highest load pressure P1 decreases and the differential pressure P3 increases, the flow rate compensating valve 77 is moved by the biasing force of the differential pressure P3 greater than the spring force of the spring 77*a* in a direction that reduces the amount of fluid supplied to the swash plate control actuator 78 to reduce the angle of inclination of the movable swash plate 31*a* to reduce the delivery flow rate D, thus reducing the delivery pressure P2. The angle of inclination of the movable swash plate 31*a* decreases until the differential pressure P3 and the biasing force of the spring 77*a* are balanced, i.e., until the differential pressure P3 reaches the target LS differential pressure P0.

The LS system 70 is further configured to change the target LS differential pressure P0. Specifically, the LS system 70 is structured to adjust the target LS differential pressure P0 according to the rotation speed, load, temperature, and/or the like of the prime mover 6. The following discusses the structure.

The flow rate compensating valve 77 is operably connected to the pressure adjusting actuator 79. The pressure adjusting actuator 79 is a hydraulic cylinder, and a fluid chamber in the cylinder thereof is fluidly connected to the reservoir tank 33 via a fluid passage 82.

The piston rod of the pressure adjusting actuator 79 which is a hydraulic cylinder is connected to the flow rate compensating valve 77. The extension or retraction of the piston rod changes the position of the flow rate compensating valve 77 in which the spring force of the spring 77*a* of the flow rate compensating valve 77 and the differential pressure P3 are balanced, thus changing the target LS differential pressure.

On the other hand, a branch fluid passage 80 branches from the fluid discharge passage 50 and is connected to the fluid passage 82. The branch fluid passage 80 is provided with a solenoid valve 81. The solenoid valve 81 is electrically connected to an output interface of the controller 26, and the solenoid of the solenoid valve 81 is energized in response to receiving a control signal CS2 outputted from the controller 26.

The opening of the solenoid valve 81 is adjusted according to the control signal CS2, and fluid in an amount corresponding to the opening is supplied from the solenoid valve 81 to a fluid chamber of the pressure adjusting actuator 79 through the fluid passage 82. The degree to which the piston rod of the pressure adjusting actuator 79 extends is determined by the amount of fluid supplied to the fluid chamber.

Note that the fluid discharge passage 50 is provided with a line filter 84, and the branch fluid passage 80 branches from the fluid discharge passage 50 at a point downstream of the line filter 84. The fluid discharge passage 50 extending from a delivery port of the hydraulic pump 32 is fluidly connected to a flow rate adjusting valve 83. The flow rate of fluid delivered by the hydraulic pump 32 into the fluid discharge passage 50 is adjusted by the flow rate adjusting valve 83, and, after the fluid passes through the line filter 84, a portion of the fluid flows into the branch fluid passage 80.

The controller 26 includes input interface(s) to which a prime mover rotation speed detector 85, a temperature detector 86, and a pair of travel speed setters 87 are electrically connected.

The prime mover rotation speed detector 85 detects the rotation speed at the output of the prime mover 6. The temperature detector 86 detects temperature such as the temperature of hydraulic fluid circulating in the hydraulic system 30, the temperature of engine oil in the case where the prime mover 6 is an internal-combustion engine and/or the like, and/or the temperature of cooling water to cool the prime mover 6 and/or the like.

The controller 26 receives a detection signal (electric signal) corresponding to the rotation speed detected by the prime mover rotation speed detector 85 and/or a detection signal (electric signal) corresponding to the temperature detected by the temperature detector 86.

The pair of travel speed setters 87 are used to set driving speeds of the respective pair of left and right traveling devices 5 (specifically, rotation speeds at the output of respective hydraulic actuators (such as hydraulic motors, HSTs) of the traveling devices 5), and are located inside the cabin 3 such that the operator seated on the operator's seat 7 operates the travel speed setters 87.

Upon operation of one of the travel speed setters 87 by the operator, an input signal (electric signal) corresponding to the operation amount of the travel speed setter 87 is transmitted to the controller 26. Each of the travel speed setters 87 is, for example, a foot pedal, and, in such a case, the degree to which the pedal is depressed corresponds to the operation amount.

The controller 26 determines whether or not to change the target LS differential pressure P0, based on the electric signal(s) inputted from the prime mover rotation speed detector 85, the temperature detector 86, and/or the travel speed setter(s) 87. If the controller 26 determines to change the target LS differential pressure P0, the controller 26 calculates an amount by which the target LS differential pressure P0 is to be changed.

Note that the controller 26 may be configured or programmed to calculate, for example, an indicator (load factor) indicating the load condition of the engine based on input signal(s) from the input device(s) 85, 86, and/or 87 and, based on the calculated indicator, determine whether or not to change the target LS differential pressure P0 and an amount by which the target LS differential pressure P0 is to be changed.

The controller 26 transmits the control signal CS2 corresponding to the calculated change amount to the solenoid of the solenoid valve 81 to energize the solenoid. The solenoid valve 81 opens to the degree that corresponds to the change amount calculated by the controller 26, and supplies fluid to the pressure adjusting actuator 79 from the fluid discharge passage 50 through the branch fluid passage 80 and the fluid passage 82.

The piston rod of the pressure adjusting actuator 79 extends to the degree that corresponds to the amount of the supplied fluid, and the position of the flow rate compensating valve 77 in which the spring force of the spring **77*a*** and the differential pressure P3 are balanced is changed according to the degree of extension. That is, the target LS differential pressure P0 is changed.

In the hydraulic system 30, the LS system 70 configured as described above functions such that, for example, when the required flow rate of hydraulic fluid to actuate a plurality of hydraulic actuators increases, the LS system 70 increases the delivery flow rate D of the hydraulic pump 31 to the maximum delivery flow rate Dm as, for example, the highest load pressure increases, to allow the flow rate of fluid supplied to each of the hydraulic actuators to approach its corresponding required flow rate.

The hydraulic system 30 further includes a special flow rate control system 90 to control the flow rate of hydraulic fluid to deal with cases where the sum of required flow rates of hydraulic fluid to a plurality of hydraulic actuators is greater than the maximum delivery flow rate, such as cases where the hydraulic actuator of the attachment and the lift arm cylinders 14 are actuated concurrently.

The following description discusses the special flow rate control system 90 to deal with cases where the lift arms 10 are raised or lowered while the rotary brush **23*a* of the sweeper 23 as an attachment is driven, with reference to FIGS. 1 to 5**.

The special flow rate control system 90 uses the controller 26 configured to output the control signal CS1 to the solenoid valve(s) 59 and/or 60 to control the AUX control valve 43 and output the control signal CS2 to the solenoid valve 81 to change the target LS differential pressure.

As illustrated in FIG. 2, the special flow rate control system 90 includes the following input devices (inputs) to input electric signals to the controller 26: a first required flow rate detector 91 to detect a required flow rate R1 of hydraulic fluid supplied to the AUX port(s) 11 (hydraulic motor 24); a second required flow rate detector 92 to detect a required flow rate R2 of hydraulic fluid supplied to the lift arm cylinders 14; a first supply flow rate detector 93 to detect a supply flow rate Q1 of hydraulic fluid actually flowing in the fluid supply/discharge passages 48 and 49; a second supply flow rate detector 94 to detect a supply flow rate Q2 of hydraulic fluid actually flowing in the fluid supply/discharge passages 44 and 45; and a delivery flow rate detector 95 to detect the delivery flow rate which is the flow rate of hydraulic fluid delivered by the hydraulic pump 31 and actually flowing in the fluid discharge passage 34.

Note that the first required flow rate detector 91 measures the operation amount of the AUX operation switch 9 (in the case where the AUX operation switch 9 is a slidable switch, the degree to which the switch is slid), and may be combined with the AUX operation switch 9 in FIG. 2. The second required flow rate detector 92 measures the operation amount of the work operation lever 8 (the angle of inclination along the front-rear direction), and may be, for example, an angle sensor and/or the like. The second required flow rate detector 92 may detect the positions of the operation valves 51 and 52.

The controller 26 includes a calculator **26*a* and a signal generator 26*b*. The calculator 26*a* calculates a total required flow rate SR, a limited required flow rate R1 a, and the like (described later) based on input signal(s) from the detector(s) 91 to 95. The signal generator 26*b* generates control signals CS1 and CS2 to be outputted to corresponding one or more of the solenoid valves 59, 60, and 81 based on the value(s) calculated by the calculator 26*a***.

Note that the meaning of the term "required flow rate" technically includes the required flow rate freely set by the operator operating an operation member which is an input device (the work operation lever 8, the AUX operation switch 9) (such a required flow rate may be hereinafter referred to as "input required flow rate") and the required flow rate corresponding to a control signal (pilot pressure, electric signal) outputted to control the position of a control valve (the lift arm control valve 41, the AUX control valve 43) to control the flow rate of hydraulic fluid supplied to hydraulic actuator(s) (such a required flow rate may be hereinafter referred to as "output required flow rate").

Usually, the output required flow rate corresponding to the control signal (pilot pressure, electric signal) outputted to a control valve is brought into conformity with the input required flow rate. Therefore, the term "required flow rate" is used without any particular distinction between the two. However, in the special flow rate control system 90 according to the present preferred embodiment, a control signal CS1 corresponding to a required flow rate (output required flow rate) which differs from (specifically, lower than) the required flow rate (input required flow rate) set using the AUX operation switch 9 is outputted.

In view of this, with regard to control of the supply flow rate Q1 of fluid supplied to the hydraulic motor 24 which is fluidly connected to the AUX port(s) 11, the input required flow rate set by operating the AUX operation switch 9 is simply referred to as "required flow rate R1", and the output required flow rate corresponding to the control signal CS1 outputted by the controller 26 is referred to as "output required flow rate R1out".

First, the following description discusses circumstances dealt with by the special flow rate control system 90. When performing cleaning of the road surface or the like, the CTL 1 has a sweeper 23 attached to the working device 4 thereof, has the pair of left and right lift arms 10 placed in the fully lowered position as illustrated in FIG. 1, has the rotary brush **23*a* of the sweeper 23 attached to the front ends of the pair of left and right lift arms 10 in contact with the ground, and travels by driving the pair of left and right traveling devices 5 while rotating the rotary brush 23*a***.

When the CTL 1 performs cleaning in such a manner, the CTL 1 may need to raise the lift arms 10 to make a turn or the like. On the contrary, with regard to the rotation of the rotary brush **23*a*, the driving of the rotary brush 23*a* may not be desired to be stopped so that the cleaning can be resumed immediately after the turn or the like is made and the lift arms 10** are lowered.

This case corresponds to a case where the operator pivots the work operation lever 8 rearward with the AUX operation switch 9 kept ON so that the rotary brush **23*a* keeps rotating at a specific speed. That is, the above case corresponds to a case where a required flow rate (input required flow rate) R1 above zero is set according to the operation amount of the AUX operation switch 9, and a required flow rate (input required flow rate) R2 above zero is set according to the operation amount of the work operation lever 8** (the angle of inclination rearward from the neutral position).

In such a case, hydraulic fluid having a discharge pressure applied thereto by the hydraulic pump 31 is supplied from the fluid discharge passage 34 to the control valves 41 and 43 at equal pressures through the branch fluid passages 36 and 38, hydraulic fluid is supplied from the lift arm control valve 41 at a flow rate equal to the required flow rate R2 to the lift arm cylinders 14, and hydraulic fluid is supplied from the AUX control valve 43 through the AUX port(s) 11 to the hydraulic motor 24 of the sweeper 23 at a flow rate equal to the required flow rate R1.

Specifically, the lift arm control valve 41 controls the supply flow rate Q2 of hydraulic fluid supplied to the lift arm cylinders 14 using the pilot pressure from the operation valve(s) 51 and/or 52 such that the supply flow rate Q2 equals the required flow rate R2. The AUX control valve 43, based on the assumption that the output required flow rate R1out corresponding to the control signal CS1 supplied to the solenoid valve(s) 59 and/or 60 is equal to the required flow rate (input required flow rate) R1 set using the AUX operation switch 9, controls the supply flow rate Q1 of hydraulic fluid supplied to the hydraulic motor 24 using the pilot pressure from the solenoid valve(s) 59 and/or 60 controlled by the control signal CS1 such that the supply flow rate Q1 equals the required flow rate R1.

However, if the total required flow rate SR which is the sum of the required flow rates R1 and R2 is greater than the maximum delivery flow rate Dm of the hydraulic pump 31, the flow rate of hydraulic fluid supplied from the fluid discharge passage 34 to the control valves 41 and 43 becomes insufficient, the supply flow rate Q2 of fluid from the lift arm control valve 41 to the lift arm cylinders 14 would decrease below the required flow rate R2, and the supply flow rate Q1 of fluid from the AUX control valve 43 to the hydraulic motor 24 would decrease below the required flow rate R1.

To avoid such circumstances, the special flow rate control system 90 is configured to set the required flow rate of fluid supplied to one of the concurrently actuated hydraulic actuators that has a lower priority than the other to a value lower than the required flow rate set using the corresponding operation member to reduce the supply flow rate of fluid supplied to that hydraulic actuator, so that the supply flow rate of fluid supplied to the other of the hydraulic actuators that has a higher priority satisfies the required flow rate.

A case in which work is being performed using the sweeper 23 corresponds to the foregoing case in which the CTL 1 raises the lift arms 10 to make a turn or the like while the rotary brush **23*a* is being driven. In such a case, the lift arms 10 are required to be raised at a speed requested by the operator, whereas the rotary brush 23*a* does not need to be driven to rotate at a speed required for work because the rotary brush 23*a* is not used while the lift arms 10** are being raised.

In view of this, the special flow rate control system 90 is configured to reduce the supply flow rate Q1 of fluid supplied to the hydraulic motor 24 and allow the supply flow rate Q2 of fluid supplied to the lift arm cylinders 14 to increase accordingly so that the supply flow rate Q2 approaches or reaches the required flow rate R2.

Note that, upon reduction of the supply flow rate Q1 of fluid supplied to the hydraulic motor 24, the flow rate of hydraulic fluid supplied from the fluid discharge passage 34 to the branch fluid passage 38 decreases. This results in an increase in flow rate of hydraulic fluid supplied from the fluid discharge passage 34 to the lift arm control valve 41 through the branch fluid passage 36 which is connected to the fluid discharge passage 34 in parallel to the branch fluid passage 38, resulting in an increase in the supply flow rate Q2 of hydraulic fluid supplied from the lift arm control valve 41 to the lift arm cylinders 14 such that the supply flow rate Q2 approaches (or reaches) the required flow rate R2.

The supply flow rate Q1 can be reduced by, for example, reducing the value (such as a duty ratio) of the control signal CS1 supplied to the solenoid valve(s) 59 and/or 60, for control of the AUX control valve 43, to shift the AUX control valve 43 in a direction that reduces the supply flow rate Q1, i.e., by temporarily reducing the output required flow rate R1out corresponding to the control signal CS1 to a value lower than the required flow rate (input required flow rate) R1 set using the AUX operation switch 9.

Figure 3:
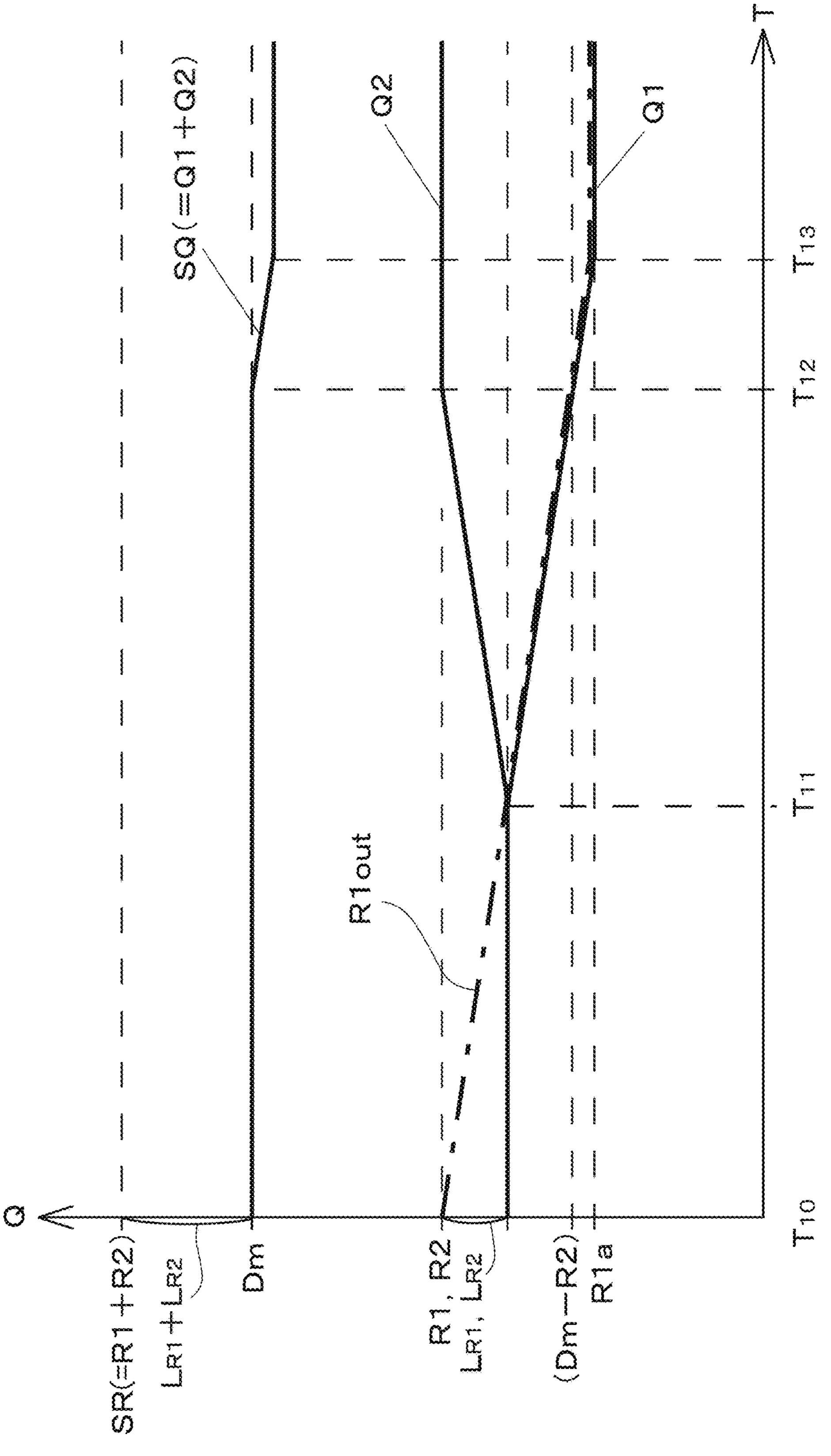
FIG. 3 is a graph showing a first pattern of required flow rate reduced by a flow rate control system.

The following description discusses, with reference to FIG. 3, the pattern in which the output required flow rate R1out decreases from the required flow rate R1 to the limited required flow rate R1a when the total required flow rate SR (which is the sum of required flow rates R1 and R2) is greater than the maximum delivery flow rate Dm, the manner in which the supply flow rate Q1 changes as the output required flow rate R1out decreases, and the resulting effect of increasing the supply flow rate Q2 of fluid supplied to the lift arm cylinders 14.

FIG. 3 shows a line chart showing changes over time in the output required flow rate R1out, supply flow rates Q1 and Q2, and total supply flow rate SQ (the sum of supply flow rates Q1 and Q2). The horizontal axis of the chart represents time T (unit is, for example, "seconds"), and the vertical axis of the chart represents flow rate Q (unit is, for example, "ml/sec."). Note that changes in the output required flow rate R1out are represented by dot-dash line, and changes in the supply flow rates Q1 and Q2 and the total supply flow rate SQ are represented by solid line. For convenience of illustration, the chart is based on the assumption that the required flow rate R1 set using the work operation lever 8 and the required flow rate R2 set using the AUX operation switch 9 are the same.

Assume that, at the point in time at which the total required flow rate SR (which is the sum of the required flow rates R1 and R2) is greater than the maximum delivery flow rate Dm, the supply flow rate Q1 is less than the required flow rate R1 by a shortage flow rate $L_{R1}$, and the supply flow rate Q2 is less than the required flow rate R2 by a shortage flow rate $L_{R2}$. It is noted here that the total supply flow rate SQ (which is equal to the maximum delivery flow rate Dm) is less than the total required flow rate SR by a shortage flow rate which is the sum of LR1 and LR2 ($L_{R1}$+$L_{R2}$).

In such circumstances, the controller 26 causes the calculator 26*a* to compare the total required flow rate SR (which is the sum of required flow rates R and R2) with the maximum delivery flow rate Dm and, if it is determined that the total required flow rate SR is greater than the maximum delivery flow rate Dm at, for example, time $T_{10}$, the controller 26 causes the calculator 26*a* to calculate a limited required flow rate R1a which is equal to or less than the difference (Dm−R2) between the maximum delivery flow rate Dm of the hydraulic pump 31 and the required flow rate R2 set for the lift arm cylinders 14.

The controller 26 initially causes the signal generator 26*b* to generate a control signal CS1 corresponding to the output required flow rate R1out which is equal to the required flow rate R1, and outputs the control signal CS1 to the solenoid valve 59 and/or the solenoid valve 60. After the calculation of the limited required flow rate R1a, the controller 26 causes the output required flow rate R1out to decrease gradually (i.e., over a certain period of time (time $T_{10}$ to time Tia) in FIG. 3) to the limited required flow rate R1a and, as the output required flow rate R1out decreases, causes the control signal CS1 outputted to the solenoid valve 59 and/or the solenoid valve 60 to change.

As the control signal CS1 changes in a manner corresponding to the decrease in the output required flow rate R1out, the spool of the AUX control valve 43 gradually moves in a direction that reduces the supply flow rate Q1. Note that the supply flow rates Q1 and Q2 stay the same (kept at the initial values (R1-$L_{R1}$) and (R2-LR2)) until the output required flow rate R1out decreases to the value (R1-$L_{R1}$) equal to the initial, actual supply flow rate Q1 which is less than the required flow rate R1 by the shortage flow rate LR1 (from time $T_{10}$ to time $T_{11}$).

Next, when the output required flow rate R1out further decreases to a value lower than the initial value (R1−$L_{R1}$) of the supply flow rate Q1 (after time $T_{11}$), the supply flow rate Q1 decreases as the spool of the AUX control valve 43 moves in the manner corresponding to the decrease in the output required flow rate R1out.

The branch fluid passages 36 and 38 are connected to the fluid discharge passage 34 in parallel to each other as described earlier, and therefore hydraulic fluid at the maximum delivery flow rate Dm in the fluid discharge passage 34 is shared by the lift arm control valve 41 and the AUX control valve 43. Therefore, the supply flow rate Q2 of hydraulic fluid supplied from the lift arm control valve 41 to the lift arm cylinders 14 increases by an amount by which the supply flow rate Q1 of fluid supplied from the AUX control valve 43 to the hydraulic motor 24 has decreased. Note that the supply flow rate Q2 can increase by the shortage flow rate LR2 which is the difference between the supply flow rate Q2 and the required flow rate R2.

As the output required flow rate R1out further decreases and the supply flow rate Q1 decreases with the movement of the spool of the AUX control valve 43, the supply flow rate Q2 further increases and, eventually, reaches the required flow rate R2 at a point in time at which the decreasing supply flow rate Q1 reaches a value equal to the difference (Dm−R2) between the maximum delivery flow rate Dm and the required flow rate R2 (at time $T_{12}$ in FIG. 3). After that, hydraulic fluid at the supply flow rate Q2 equal to the required flow rate R2 is supplied to the lift arm cylinders 14, and the lift arms 10 are raised at a speed set using the work operation lever 8.

Note that, in the present preferred embodiment, since the limited required flow rate R1a is set to a value smaller than the difference (Dm−R2) between the maximum delivery flow rate Dm and the required flow rate R2, also after the hydraulic fluid at the supply flow rate Q2 equal to the required flow rate R2 starts being supplied to the lift arm cylinders 14 (also after time $T_{12}$), the supply flow rate Q1 continues to decrease until the decreasing output required flow rate R1out reaches the limited required flow rate R1a (until time $T_{13}$).

After the output required flow rate R1out reaches the limited required flow rate R1a (after time $T_{13}$), hydraulic fluid at the supply flow rate Q1 equal to the limited required flow rate R1a continues to be supplied to the hydraulic motor 24. Specifically, provided that the positions (operation states) of the work operation lever 8 and the AUX operation switch 9 are maintained and the required flow rates R1 and R2 are maintained at the set values, the lift arm cylinders 14 are supplied with hydraulic fluid at the supply flow rate Q2 equal to the required flow rate R2 and the lift arms 10 continue moving at a speed desired by the operator, whereas the hydraulic motor 24 is supplied with hydraulic fluid at the supply flow rate Q1 which is equal to the limited required flow rate R1 a lower than the required flow rate R1 and the rotary brush 23*a* continues to rotate at a reduced speed.

As has been described, by shifting the AUX control valve 43 in a direction that reduces the supply flow rate Q1, the lift arm cylinders 14 are supplied with hydraulic fluid at a flow rate equal to or near the required flow rate R2 from the lift arm control valve 41, and the lift arms 10 are raised at a speed equal to or near the speed set using the work operation lever 8. While the lift arms 10 are being raised, the rotary brush 23*a* of the sweeper 23 continues to rotate, but decreases in rotation speed as the supply flow rate Q1 decreases.

Note that with regard to reducing the supply flow rate Q1, it is not always necessary to reduce the supply flow rate Q1 to an extent that allows the supply flow rate Q2 to reach the required flow rate R2. For example, when the supply flow rate Q1 is gradually reduced, the supply flow rate Q2 increases also gradually, and therefore the lift arms 10 may reach a target position before the supply flow rate Q2 reaches the required flow rate R2. Further reductions in the supply flow rate Q1 may be stopped at a point in time at which the lift arms 10 reach the target position.

There may be cases in which the operator is satisfied when the supply flow rate Q2 is close to the required flow rate R2 even if the supply flow rate Q2 does not reach the required flow rate R2. For example, the limited required flow rate R1a does not need to be a low value such as equal to or less than the difference (Dm−R2) between the maximum delivery flow rate Dm and the required flow rate R2, and may be a value that is less than the required flow rate R1 and that allows the supply flow rate Q2 to increase to a value near the required flow rate R2.

That is, the special flow rate control system 90 may be configured such that, if the controller 26 determines that the total required flow rate SR is greater than the maximum delivery flow rate Dm, the supply flow rate Q1 is reduced to allow the supply flow rate Q2 to at least approach the required flow rate R2.

Note that a decrease in the actual supply flow rate Q1 of fluid supplied to the hydraulic motor 24 of the sweeper 23 not only achieves the effect of allowing the actual supply flow rate Q2 of fluid supplied to the lift arm cylinders 14 to increase to reach the required flow rate R2, but also achieves the effect of improving the durability of the pressure compensating valve 73 connected to the AUX control valve 43.

Specifically, when the supply flow rate Q1 is kept high, the hydraulic fluid at such a flow rate passes through the pressure compensating valve 73, and therefore the pressure compensating valve 73 increases in temperature, resulting in a reduction in durability. However, when the actual supply flow rate Q1 is reduced, the flow rate of the hydraulic fluid passing through the pressure compensating valve 73 also decreases, making it possible to prevent or reduce an increase in temperature of the pressure compensating valve 73.

Note that, as described earlier, the special flow rate control system 90 is configured such that the output required flow rate R1out is reduced from the required flow rate R1 to the limited required flow rate R1a over a certain period of time (i.e., gradually), so that the supply flow rate Q1 of hydraulic fluid supplied to the AUX port(s) 11 decreases (the rotation speed of the rotary brush 23*a* of the sweeper 23 decreases) over a certain period of time (i.e., gradually).

This is because, if the supply flow rate Q1 is reduced suddenly, the rotation speed of the rotary brush 23*a* suddenly decreases and the operator may recognize that the sweeper 23 undergoes malfunction (failure) and perform wrong operation such as, for example, unnecessarily stopping the operation of the CLT 1.

An example of a pattern in which the output required flow rate R1out decreases from the required flow rate R1 to the limited required flow rate R1a would be a pattern in which the output required flow rate R1out decreases at a constant rate (by a constant amount per unit time). In FIG. 3, such a pattern in which the output required flow rate R1out decreases is represented by a straight line graph sloping at an angle. The decrease in the supply flow rate Q1, the increase in the supply flow rate Q2, and the change (decrease) in the total supply flow rate SQ resulting from the decrease in the output required flow rate R1out are also represented by straight line sloping at an angle.

Another example would be a pattern in which the output required flow rate R1out decreases from the required flow rate R1 to the limited required flow rate R1a stepwise. When the changes in the output required flow rate R1out in such a case are plotted on a chart with time T on the horizontal axis and flow rate Q on the vertical axis as with FIG. 3, the resulting graph is in the form of steps (dot-dash line graph in FIG. 4) as shown in FIG. 4.

Figure 4:
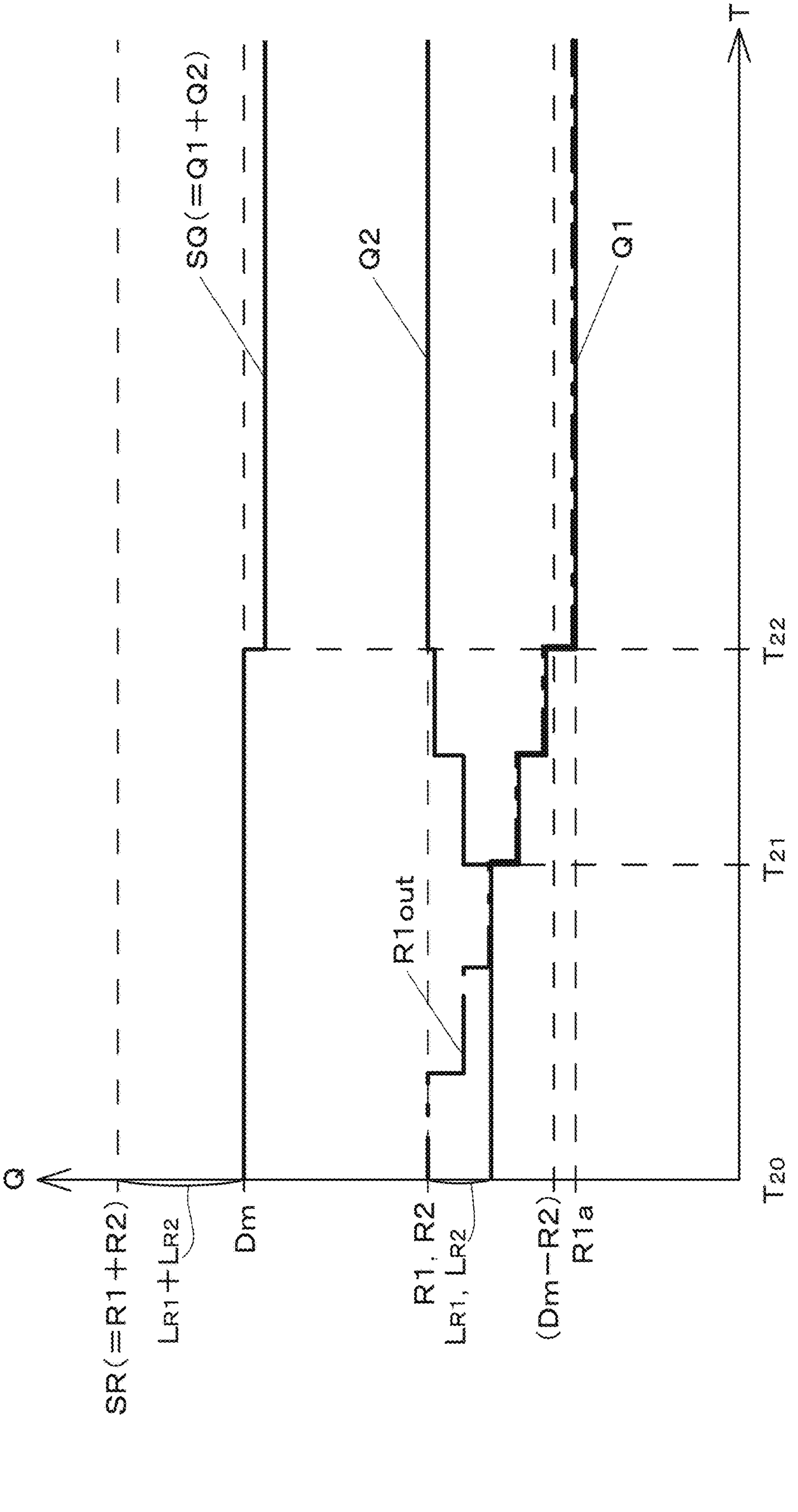
FIG. 4 is a graph showing a second pattern of required flow rate reduced by the flow rate control system.

Note that FIG. 4 also shows the changes in the supply flow rates Q1 and Q2 and the total supply flow rate SQ (the sum of the supply flow rates Q1 and Q2) resulting from the changes in the output required flow rate R1out, similarly to FIG. 3. These changes resulting from the stepwise decrease in the output required flow rate R1out (the decrease in the supply flow rate Q1, increase in the supply flow rate Q2, and decrease in the total supply flow rate SQ) are also represented by stepped line (solid line graph in FIG. 4).

That is, in the preferred embodiment shown in FIG. 4, the output required flow rate R1out decreases stepwise from time $T_{20}$ at which it is determined that the total required flow rate SR is greater than the maximum delivery flow rate Dm. Both the supply flow rates Q1 and Q2 stay at the initial value ($R1\text{-}L_{R1}$), ($R2\text{-}L_{R2}$) until the stepwise decreasing output required flow rate R1out reaches a value ($R1\text{-}L_{R1}$) equal to the initial, actual supply flow rate Q1.

When the output required flow rate R1out decreases to a value lower than the initial value ($R1\text{-}L_{R1}$) of the supply flow rate Q1 (at time $T_{21}$), the spool of the AUX control valve 43 moves, allowing the supply flow rate Q1 to decrease by a step. Upon the decrease in the supply flow rate Q1, the supply flow rate Q2 increases by a step. After that, as the output required flow rate R1out decreases stepwise, the supply flow rate Q1 decreases stepwise and accordingly the supply flow rate Q2 increases stepwise.

Eventually, when the output required flow rate R1out decreases to the limited required flow rate R1a (at time $T_{22}$), the supply flow rate Q1 decreases by a step to the limited required flow rate R1a and, accordingly, the supply flow rate Q2 increases to reach the required flow rate R2. After that, provided that the required flow rates R1 and R2 are maintained, the lift arm cylinders 14 continue being supplied with hydraulic fluid at the supply flow rate Q2 equal to the required flow rate R2, and the hydraulic motor 24 continues to be supplied with hydraulic fluid at the supply flow rate Q1 equal to the limited required flow rate R1a which is lower than the required flow rate R1.

Note that, in the present preferred embodiment, the supply flow rate Q1 decreases in a stepwise manner as described above. In this regard, for example, the supply flow rate Q1 may be reduced gradually in the following manner, without having to calculate or set the limited required flow rate R1a. Whether the supply flow rate Q2 has reached the required flow rate R2 is checked after hydraulic fluid has been supplied at a constant supply flow rate Q1 for a certain period of time; if the supply flow rate Q2 has not reached the required flow rate R2, the supply flow rate Q1 is reduced by a step and hydraulic fluid continues to be supplied at that reduced supply flow rate Q1 for a certain period of time; and if the supply flow rate Q2 has reached the required flow rate R2, the supply flow rate Q1 is not reduced anymore.

Also note that the graph of the output required flow rate R1out as shown in FIG. 3 or 4 may be used as a map for the controller 26 to cause the signal generator 26*b* to generate a control signal CS1. Such a map may be stored in a memory in the controller 26 and/or a memory externally connected to (or remotely connected to) the controller 26.

After the lift arms 10 are swung upward to raise the sweeper 23 and a desired action such as making a turn is completed, the operator operates the work operation lever 8 to retract the piston rods of the lift arm cylinders 14 to lower the lift arms 10 to the fully lowered position as illustrated in FIG. 1, thus bringing the rotary brush 23*a* of the sweeper 23 into contact with the ground. The controller 26 brings the rotation speed of the rotary brush 23*a* back to the speed originally set using the AUX operation switch 9 to resume cleaning with the CTL 1 when the rotary brush 23*a* contacts the ground or immediately before or after the rotary brush 23*a* contacts the ground.

Note that the rotation speed of the rotary brush 23*a* does not need to be brought back to the originally set rotation speed gradually (over time) like when the rotation speed of the rotary brush 23*a* is reduced while the lift arms 10 are raised upward, and may be brought back to the originally set rotation speed quickly immediately before the rotary brush 23*a* contacts the ground, when the rotary brush 23*a* contacts the ground, or immediately after the rotary brush 23*a* contacts the ground. That is, the output required flow rate R1out corresponding to the control signal CS1 transmitted from the controller 26 to the solenoid valve(s) 59 and/or 60 may be changed quickly from the limited required flow rate R1a to the required flow rate R1.

Also with regard to an increase in the supply flow rate Q1 in such a case, the supply flow rate Q1 does not need to reach the required flow rate R1, provided that the supply flow rate Q1 at least approaches the required flow rate R1.

Furthermore, also with regard to a reduction in the supply flow rate Q1 to allow the supply flow rate Q2 to approach the required flow rate R2, the supply flow rate Q1 does not need to be reduced gradually (over a certain period of time).

Figure 5:
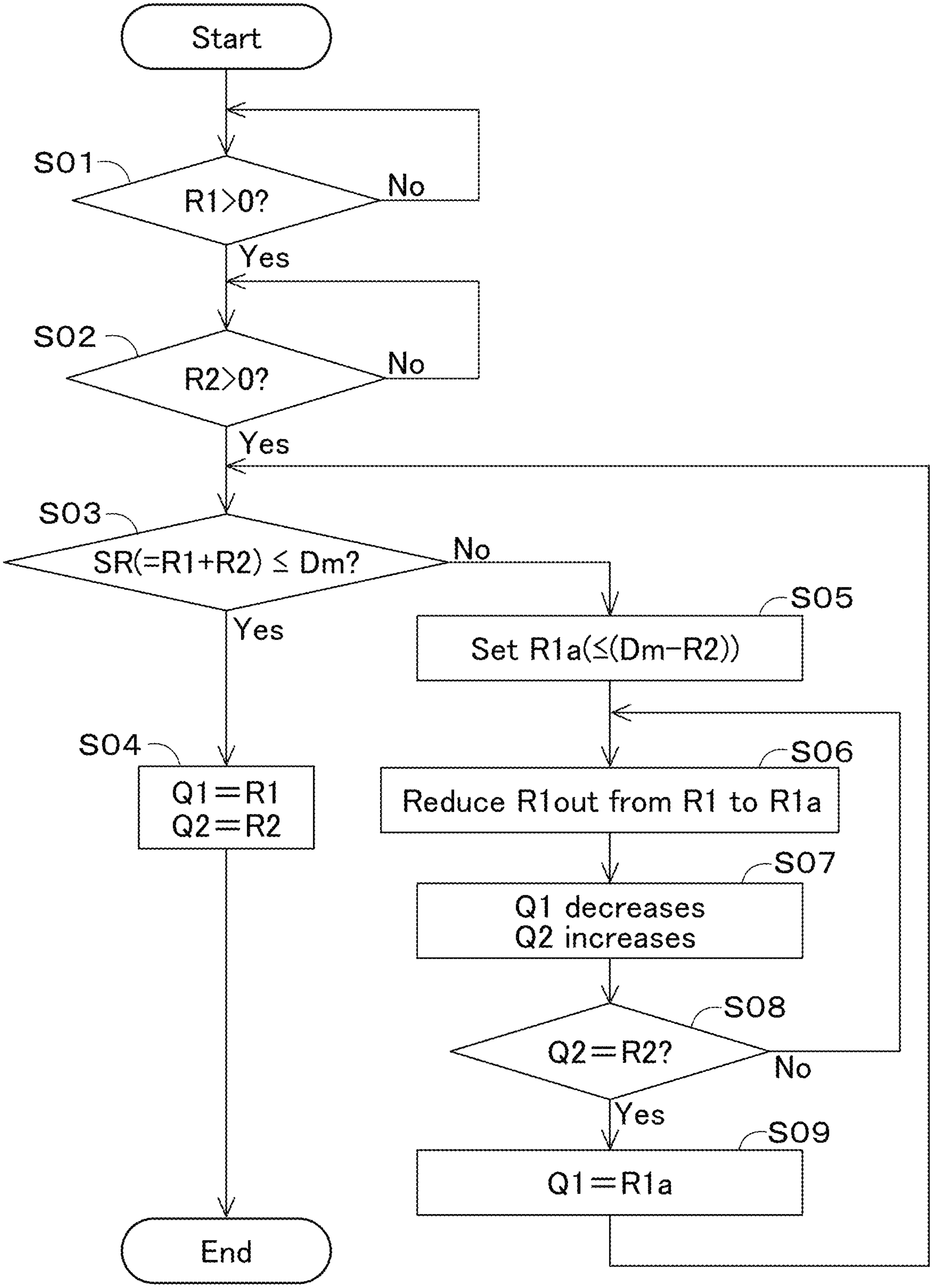
FIG. 5 is a flowchart of flow rate control performed by the flow rate control system.

The flowchart of FIG. 5 shows a flow of flow rate control performed by the special flow rate control system 90 as discussed above. The following discusses the flowchart. Note that, although the flowchart of FIG. 5 is based on the assumption that the flowchart is applied to the flow rate control process as shown in FIG. 3, the flowchart of FIG. 5 may also be applied to, for example, the flow rate control process as shown in FIG. 4, by changing the content of steps(s) and/or skipping step(s) as needed (described later).

The controller 26 first determines whether or not a value greater than zero is set as the required flow rate R1 of fluid supplied to the hydraulic motor 24 (S01) by the input signal from the AUX operation switch 9. If a required flow rate R1 greater than zero is set (YES in S01), the controller 26 detects the angle of rearward inclination of the work operation lever 8, the opening of the operation valve 51, the flow rate of pilot pressure fluid flowing through the pilot fluid passage 55, and/or the like to determine whether or not a value greater than zero is set as the required flow rate R2 of fluid supplied to the lift arm cylinders 14 to cause the lift arms 10 to swing upward (S02).

If a required flow rate R2 greater than zero is set (YES in S02), the controller 26 compares the total required flow rate SR (which is the sum of the required flow rates R1 and R2) with the maximum delivery flow rate Dm of the hydraulic pump 31 (S03).

If the total required flow rate SR is equal to or less than the maximum delivery flow rate Dm (YES in S03), the special flow rate control system 90 (controller 26) supplies hydraulic fluid at the supply flow rate Q1 equal to the required flow rate R1 to the hydraulic motor 24, and supplies hydraulic fluid at the supply flow rate Q2 equal to the supply flow rate Q2 to the lift arm cylinders 14 (S04).

If the total required flow rate SR is greater than the maximum delivery flow rate Dm (NO in S03), the controller 26 causes the calculator 26*a* to calculate a limited required flow rate R1a equal to or less than the difference between the maximum delivery flow rate Dm and the required flow rate R2, and sets the calculated limited required flow rate R1a as a target value of the output required flow rate R1out (S05).

Upon setting the limited required flow rate R1a by the controller 26, the special flow rate control system 90 (controller 26) (preferably gradually) reduces the output required flow rate R1out, corresponding to the control signal CS1 supplied to the solenoid valve(s) 59 and/or 60, from the original value equal to the required flow rate R1 to the limited required flow rate R1a (S06).

Reducing the output required flow rate R1out in the above-described manner means moving (shifting) the AUX control valve 43 in a direction that reduces the supply flow rate Q1. When the output required flow rate R1out has been reduced to some extent (specifically, decreased to a value corresponding to the difference (Dm−R2) between the maximum delivery flow rate Dm and the required flow rate R2) and further reduced by the special flow rate control system 90 (controller 26), the supply flow rate Q1 of fluid supplied from the AUX control valve 43 to the hydraulic motor 24 (preferably gradually) decreases with the decrease, and the supply flow rate Q2 of fluid supplied from the lift arm control valve 41 to the lift arm cylinders 14 increases accordingly (S07).

That is, as the special flow rate control system 90 (controller 26) reduces the output required flow rate R1out, the supply flow rate Q2 increases. Therefore, the output required flow rate R1out continues to be reduced (S09) at least until the supply flow rate Q2 reaches the required flow rate R2 (NO in S08).

After the supply flow rate Q2 of fluid supplied to the lift arm cylinders 14 reaches the required flow rate R2 (YES in S08), i.e., while the lift arms 10 are swinging upward at a speed set using the work operation lever 8, the decreasing supply flow rate Q1 of fluid supplied to the hydraulic motor 24 reaches the limited required flow rate R1a and stops decreasing, and hydraulic fluid at the supply flow rate Q1 equal to the limited required flow rate R1a continues to be supplied to the hydraulic motor 24 (S09). That is, the rotary brush 23*a* of the sweeper 23 continues to rotate at low speed.

After that, when it is determined that the total required flow rate SR (which is the sum of the required flow rates R1 and R2) has become equal to or less than the maximum delivery flow rate Dm (YES in S08) because, for example, the work operation lever 8 has been pivoted toward the neutral position, the controller 26 brings the supply flow rate Q1 of fluid supplied to the hydraulic motor 24 back to the value equal to the required flow rate R1 (S04). This is achieved by bringing the output required flow rate R1out back to the value equal to the required flow rate R1.

The flowchart of FIG. 5 as described above can be arranged by, for example, changing the content of step(s) and/or skipping step(s) in various manners.

For example, with regard to step S05 of the flowchart of FIG. 5, the limited required flow rate R1a does not need to be as low as the difference (Dm−R2) between the maximum delivery flow rate Dm and the required flow rate R2, provided that the limited required flow rate R1a is a value that is less than the required flow rate R1 and that can actually cause a reduction in the supply flow rate Q1 (in the present preferred embodiment, a value that is less than ($R1-L_{R1}$)).

Steps S05 and S09 may be skipped. Specifically, the limited required flow rate R1a does not need to be set and, for example, as discussed earlier with regard to the flow rate control process in FIG. 4, the supply flow rate Q1 may be reduced in a stepwise manner according to the manner in which the supply flow rate Q2 increases.

Step S08 may be skipped. Specifically, as discussed earlier, when the total required flow rate SR is greater than the maximum delivery flow rate Dm, the supply flow rate Q2 does not need to be increased to reach the required flow rate R2, provided that the supply flow rate Q2 is increased to at least approach the required flow rate R2.

Similarly, also when the total required flow rate SR has become equal to or less than the maximum delivery flow rate Dm after the total required flow rate SR has exceeded the maximum delivery flow rate Dm and the special flow rate control system 90 has reduced the supply flow rate Q1, the supply flow rate Q1 does not need to be increased to reach the required flow rate R1, provided that the supply flow rate Q1 is increased to at least approach the required flow rate R1.

In the special flow rate control system 90 configured as described above, the output required flow rate R1out, which is reduced to allow the supply flow rate Q2 to increase to the required flow rate R2, corresponds to the control signal CS1 outputted from the controller 26 to the solenoid valve(s) 59 and/or 60 to control the flow of pilot pressure fluid to the AUX control valve 43 (which is a direction switching valve controlled by pilot pressure) as described earlier.

That is, the hydraulic system 30 in FIG. 2 includes the special flow rate control system 90 to reduce the supply flow rate Q1 to allow the supply flow rate Q2 to reach the required flow rate R2, and the special flow rate control system 90 includes: the controller 26 (calculator 26*a*, signal generator 26*b*) which is a flow rate controller to allow the supply flow rate Q1 of fluid supplied to the AUX port(s) 11 (hydraulic motor 24) to match the required flow rate R1; the input devices 91 to 95 electrically connected to the controller 26; and the solenoid valves 59 and 60 and the AUX control valve 43 as output devices electrically connected to the controller 26.

Figure 6:
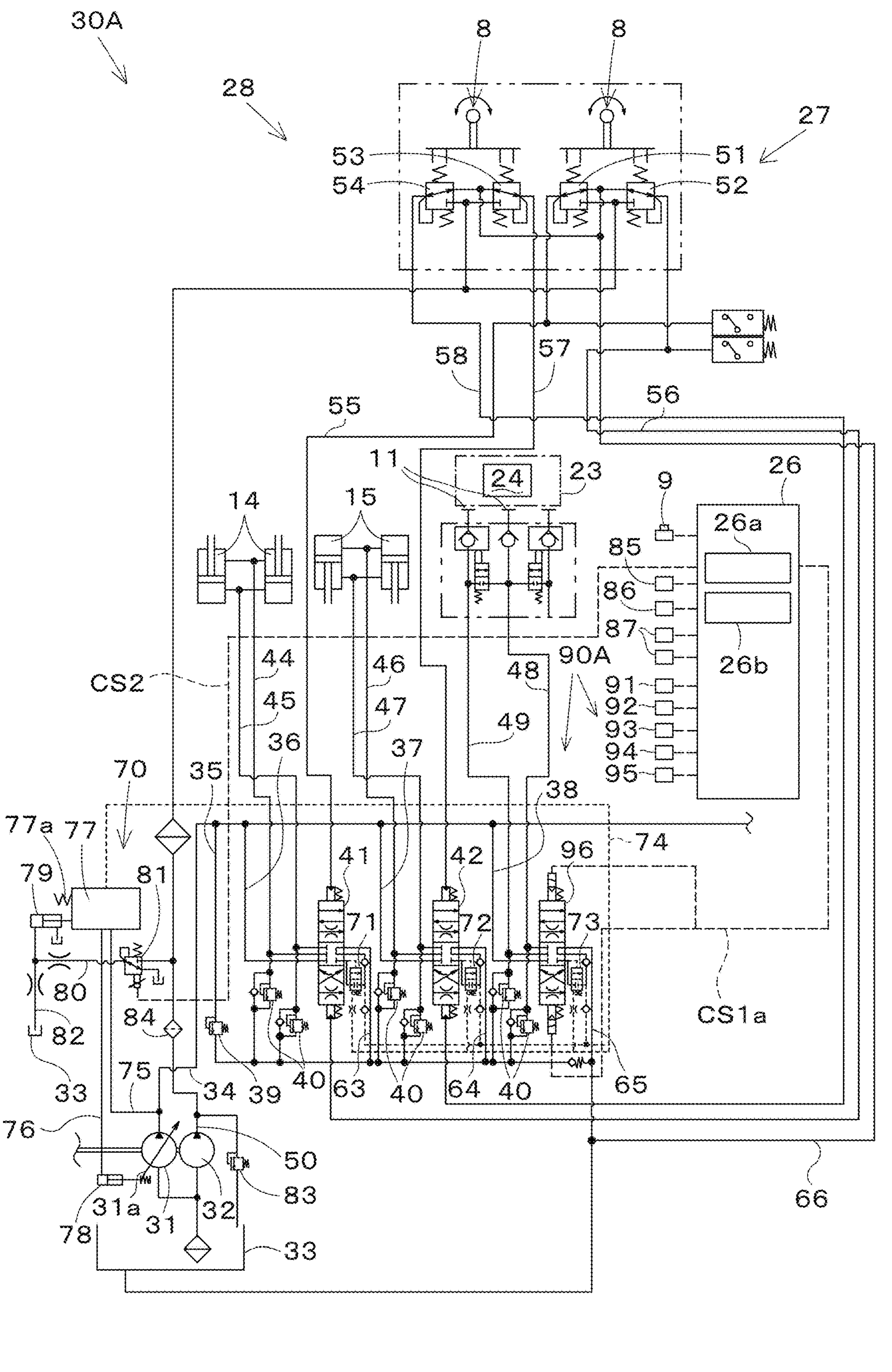
FIG. 6 is a circuit diagram of a hydraulic system for a working machine according to a second preferred embodiment of the present invention.
Figure 7:
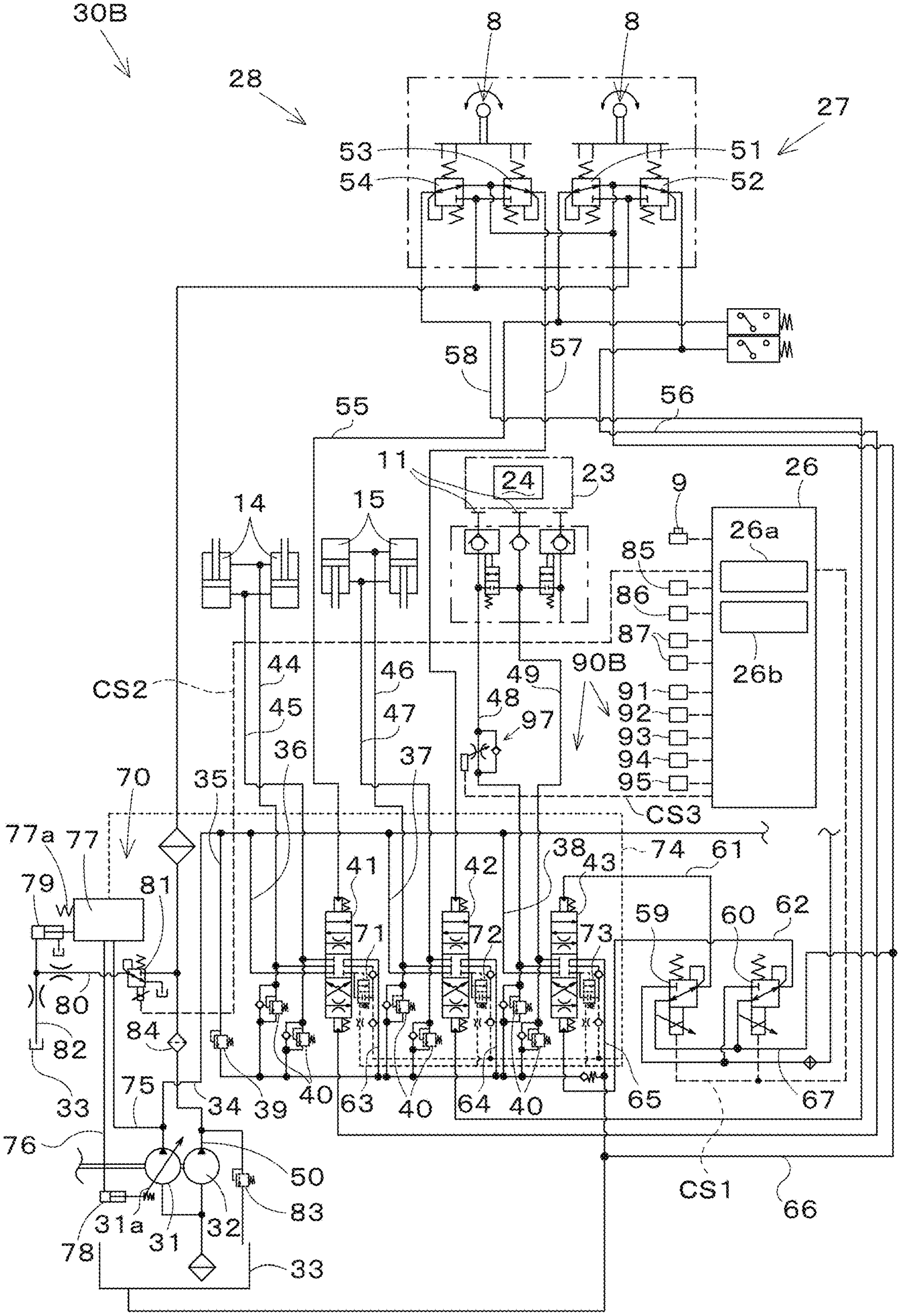
FIG. 7 is a circuit diagram of a hydraulic system for a working machine according to a third preferred embodiment of the present invention.

Note, however, that there are other possible examples of a flow rate control system configured to reduce the supply flow rate Q1 to allow the supply flow rate Q2 to reach (or approach) the required flow rate R2. FIGS. 6 and 7 show such examples.

FIG. 6 shows a hydraulic system 30A including, as an AUX control valve to supply hydraulic fluid to AUX port(s) 11, an AUX control valve 96 which is a solenoid valve instead of the AUX control valve 43 controlled by pilot pressure. The AUX control valve 96 includes solenoids on the opposite sides of the spool thereof instead of the pressure receivers on the opposite sides of the spool of the AUX control valve 43.

In the hydraulic system 30A in FIG. 6, the solenoid valves 59 and 60 to supply pilot pressure fluid are not necessary. Therefore, such solenoid valves are not provided. Instead, the solenoids of the AUX control valve 96 and output interface(s) of the controller 26 are electrically connected to each other.

The hydraulic system 30A is the same as the hydraulic system 30 in FIG. 2 except for the above-described aspects. The hydraulic system 30A includes a special flow rate control system 90A to reduce the supply flow rate Q1 to allow the supply flow rate Q2 to reach (or approach) the required flow rate R2, and the special flow rate control system 90A includes a controller 26 (calculator 26*a*, signal generator 26*b*), input devices 91 to 95 electrically connected to the controller 26, and the AUX control valve 96 as an output device electrically connected to the controller 26.

The controller 26 usually outputs, to the solenoid(s) of the AUX control valve 96, a control signal CS1*a* corresponding to an output required flow rate R1out equal to a required flow rate R1 set using the AUX operation switch 9.

When the upward swinging movement (ascending) of the lift arms 10 and the rotation/driving of the rotary brush 23*a* of the sweeper 23 are performed concurrently, if the total required flow rate SR (the sum of the required flow rates R1 and R2) is greater than the maximum delivery flow rate Dm, the control signal CS1*a* outputted from the controller 26 to the solenoid(s) of the AUX control valve 96 is changed.

Such a change in the control signal CS1*a* corresponds to, for example, the gradual reduction of the output required flow rate R1out from the required flow rate R1 to the limited required flow rate R1a as shown in FIG. 3 or the reduction of the output required flow rate R1out from the required flow rate R1 as shown in FIG. 4.

Upon such a change in the control signal CS1*a*, the AUX control valve 96 (the spool of the AUX control valve 96) moves in a direction that reduces the supply flow rate Q1 of fluid supplied to the AUX port(s) 11. With this, the supply flow rate Q1 actually decreases, and the supply flow rate Q2 of fluid supplied from the lift arm control valve 41 to the lift arm cylinders 14 accordingly increases to reach the required flow rate R2.

As described above, in the special flow rate control system 90 or 90A in FIG. 2 or FIG. 6, the AUX control valve 43 or 96 which is basically controlled to supply hydraulic fluid at the supply flow rate Q1 equal to the required flow rate R1 set using the AUX operation switch 9 to the AUX port(s) 11 (to the hydraulic actuator connected to the AUX port(s) 11) also functions as a valve controlled to reduce the supply flow rate Q1 to allow the supply flow rate Q2 to reach the required flow rate R2. In other words, the special flow rate control system 90 or 90A in FIG. 2 or FIG. 6 is configured such that the controller 26, which is configured or programmed to control the position of the AUX flow rate control valve 43 or 96 to allow the supply flow rate Q1 to match the required flow rate R1, changes the position of the AUX flow rate control valve 43 or 96 to reduce the supply flow rate Q1 to allow the supply flow rate Q2 to approach the required flow rate R2.

In contrast, the preferred embodiment shown in FIG. 7 includes a dedicated valve controlled to reduce the supply flow rate Q1 to achieve the above function independently of the AUX control valve 43 or 96.

Specifically, FIG. 7 shows a hydraulic system 30B including, as an element of a special flow rate control system 90B which deals with cases where the total required flow rate SR is greater than the maximum delivery flow rate Dm, a variable throttle 97 provided in the fluid supply/discharge passage 48 or the fluid supply/discharge passage 49 which connect between the AUX control valve 43 or 96 and the AUX port(s) 11 (in the present preferred embodiment, in the fluid supply/discharge passage 48). Such variable throttles 97 may be provided both in the fluid supply/discharge passages 48 and 49.

In the hydraulic system 30B in FIG. 7, the special flow rate control system 90B includes the controller 26 as with the special flow rate control systems 90 and 90A, and also includes input devices 91 to 95 connected to the controller 26.

In the hydraulic system 30B, the AUX control valve 43 or 96 is controlled by the controller 26 to a position to deliver hydraulic fluid at the supply flow rate Q1 equal to the required flow rate R1 set using the AUX operation switch 9, regardless of whether or not the total required flow rate SR is equal to or less than maximum delivery flow rate Dm.

On the other hand, in the special flow rate control system 90B, the variable throttle 97 is electrically connected to an output interface of the controller 26, and the degree of closing of the variable throttle 97 is controlled by the controller 26.

The variable throttle 97 is configured such that, provided that the calculator 26*a* of the controller 26 determines that the total required flow rate SR is equal to or less than the maximum delivery flow rate Dm, the degree of closing of the variable throttle 97 is zero (i.e., fully opened) so that the entire hydraulic fluid to be discharged from the AUX control valve 43 to the hydraulic motor 24 (i.e., at the supply flow rate Q1 equal to the required flow rate R1) is allowed to pass through the variable throttle 97.

The calculator 26*a* of the controller 26, upon determining that the total required flow rate SR is greater than the maximum delivery flow rate Dm, calculates a limited required flow rate R1 a equal to or less than the difference between the maximum delivery flow rate Dm and the required flow rate R2 in the same manner as the controller 26 of the special flow rate control systems 90 and 90A, and gradually increases the degree of closing (gradually reduces the degree of opening) to allow the supply flow rate Q1 to gradually decrease to the limited required flow rate R1a (or to allow the supply flow rate Q1 to gradually decrease to allow the supply flow rate Q2 to approach the required flow rate R2 without setting the limited required flow rate R1a). To this end, the signal generator 26*b* generates a control signal CS3 to control the degree of closing of the variable throttle 97 and outputs the control signal CS3 to the variable throttle 97.

Note that, in the special flow rate control system 90B in FIG. 7, the controller 26 which is configured or programmed to control the position of the AUX control valve 43 or 96 is used to generate and output the control signal CS3 to control the degree of closing of the variable throttle 97 to the variable throttle 97. Note, however, that in the present preferred embodiment, also while the control signal CS3 is outputted to the variable throttle 97 to reduce the supply flow rate Q1, the controller 26 controls the AUX control valve 43 or 96 to a position that allows the supply flow rate Q1 to match the required flow rate R1.

Therefore, the special flow rate control system 90B may include a flow rate controller to control the variable throttle 97, independently of the controller 26. In such a case, the flow rate controller to control the variable throttle 97 may be connected to input devices similar to the foregoing input devices 91 to 95, and the flow rate controller may include a calculator to calculate the total required flow rate SR, the limited required flow rate R1 a, and/or the like based on input signal(s) from such input device(s), a signal generator to generate the control signal CS3, and/or the like.

Note that, in the case where the special flow rate control system 90B uses the controller 26 as in FIG. 7, the controller 26 is capable of achieving such a process of reducing the supply flow rate Q1 simply by acquiring, for example, program(s) of a simple control process of controlling the degree of closing of the variable throttle 97.

Also in the special flow rate control systems 90 and 90A, in order to change the position of the AUX control valve 43 or 96 to further reduce the supply flow rate Q1 less than the required flow rate R1, it is not necessary to use the controller 26 which is configured to control the position of the AUX control valve 43 or 96 to allow the supply flow rate Q1 to match the required flow rate R1. The special flow rate control systems 90 and 90A may include a controller to control the position of the AUX control valve 43 or 96 to further reduce the supply flow rate Q1 less than the required flow rate R1 upon determination that the total required flow rate SR is greater than the maximum delivery flow rate Dm, independently of the controller 26.

The following description discusses effect(s) which can be achieved by feature(s) of the foregoing hydraulic system(s) 30, 30A, and/or 30B for a working machine.

A hydraulic system 30, 30A, 30B for a compact track loader (CTL) (working machine) 1 includes a hydraulic pump 31, a hydraulic motor 24 (first hydraulic actuator) to be actuated by hydraulic fluid delivered by the hydraulic pump 31, a lift arm cylinder 14 (second hydraulic actuator) to be actuated by hydraulic fluid delivered by the hydraulic pump 31, an AUX operation switch 9 (first operation member) to be operated to set a required flow rate R1 (first required flow rate), a work operation lever 8 (second operation member) to be operated to set a required flow rate R2 (second required flow rate), a controller 26 (first flow rate controller) to control a supply flow rate Q1 (first supply flow rate) which is a flow rate of hydraulic fluid supplied to the hydraulic motor 24 such that the supply flow rate Q1 matches the required flow rate R1 set by operating the AUX operation switch 9, a flow rate controller 27 (second flow rate controller) to control a supply flow rate Q2 (second supply flow rate) which is a flow rate of hydraulic fluid supplied to the lift arm cylinder 14 such that the supply flow rate Q2 matches the required flow rate R2 set by operating the work operation lever 8, and a special flow rate control system 90, 90A, 90B to, if it is determined that a total required flow rate SR which is the sum of the required flow rate R1 and the required flow rate R2 is greater than a maximum delivery flow rate Dm which is the maximum flow rate of hydraulic fluid deliverable by the hydraulic pump 31, reduce the supply flow rate Q1 to allow the supply flow rate Q2 to approach the required flow rate R2.

With this configuration, the CTL 1 (working machine) equipped with, for example, a sweeper 23 achieves the following effects. Specifically, it is possible to eliminate or reduce the likelihood that, when the total required flow rate SR is greater than the maximum delivery flow rate Dm as a result of concurrently performed operation of the AUX operation switch 9 (first operation member) to drive the rotary brush 23*a* of the sweeper 23 and operation of the work operation lever 8 (second operation member) to cause the lift arms 10 to swing upward or downward, both the supply flow rate Q1 (first supply flow rate) of hydraulic fluid supplied to the hydraulic motor 24 (first hydraulic actuator) to drive the rotary brush 23*a* and the supply flow rate Q2 (second supply flow rate) of hydraulic fluid supplied to the lift arm cylinders 14 (second hydraulic actuators) to drive the lift arms 10 will become less than the respective required flow rates R1 and R2 (first required flow rate, second required flow rate), resulting in insufficiency of driving speed of both the rotary brush 23*a* and the lift arms 10. By bringing the supply flow rate Q2 for the prioritized lift arm cylinders 14 close to the required flow rate R2, it is possible to ensure operations at a desired speed or at a speed close to the desired speed. On the contrary, since the supply flow rate Q1 for the hydraulic motor 24 with lower priority is kept low, it is possible to reduce loads on elements relating to driving of the hydraulic motor 24 in the hydraulic system 30, 30A, 30B to improve the durability of the elements.

The special flow rate control system 90, 90A, 90B may, if it is determined that the total required flow rate SR is greater than the maximum delivery flow rate Dm, set a limited required flow rate R1a which is less than the required flow rate R1 and reduce the supply flow rate Q1 to the limited required flow rate R1a to allow the supply flow rate Q2 to approach the required flow rate R2.

With this configuration, since the supply flow rate Q1 is reduced to the limited required flow rate R1a set as a value lower than the required flow rate R1, the supply flow rate Q2 reliably approaches the required flow rate R2.

The special flow rate control system 90, 90A, 90B may, if it is determined that the total required flow rate SR is greater than the maximum delivery flow rate Dm, set a limited required flow rate R1a which is equal to or less than a difference (Dm−R2) between the maximum delivery flow rate Dm and the required flow rate R2 and reduce the supply flow rate Q1 to the limited required flow rate R1a to allow the supply flow rate Q2 to approach the required flow rate R2.

With this configuration, since the supply flow rate Q1 is reduced to the limited required flow rate R1a set as a value equal to or less than the difference (Dm−R2) between the maximum delivery flow rate Dm and the required flow rate R2, the supply flow rate Q2 reliably approaches the required flow rate R2.

The special flow rate control system 90, 90A, 90B may, if it is determined that the total required flow rate SR is greater than the maximum delivery flow rate Dm when the second required flow rate R2 is set after the first required flow rate R1 is set, reduce the supply flow rate Q1 to allow the supply flow rate Q2 to approach the required flow rate R2.

The above configuration is applicable to cases where, for example, in the case of the CTL 1 (working machine) equipped with the sweeper 23, after the operator turns on the AUX operation switch 9 to rotate the rotary brush 23*a*, while the CTL 1 is traveling while cleaning the ground with the sweeper 23, the operator operates the work operation lever 8 to raise the lift arms 10 to make a turn. Specifically, in cases where the above configuration is applied, when the operator turns on the AUX operation switch 9 to set a required flow rate R1 (first required flow rate) of fluid supplied to the hydraulic motor 24 and then operates the work operation lever 8 to set a required flow rate R2 (second required flow rate) of fluid supplied to the lift arm cylinders 14, the controller 26 compares the total required flow rate SR which is the sum of the required flow rates R1 and R2 with the maximum delivery flow rate Dm of the hydraulic pump 31 and, upon determining that the total required flow rate SR is greater than the maximum delivery flow rate Dm, reduces the supply flow rate Q1 of fluid supplied to the hydraulic motor 24 with lower priority because the sweeper 23 does not perform cleaning while the lift arms 10 are swung upward to allow the supply flow rate Q2 of fluid supplied to the lift arm cylinders 14 to approach the required flow rate R2, making it possible to allow the lift arms 10 to be raised at a speed desired by the operator or at a speed close to the desired speed and achieve smooth turning of the CLT 1.

The special flow rate control system 90, 90A, 90B may, if it is determined that the total required flow rate SR is greater than the maximum delivery flow rate Dm, gradually reduce the supply flow rate Q1 to allow the supply flow rate Q2 to approach the required flow rate R2.

With this configuration, the supply flow rate Q1 is reduced gradually. This makes it possible to eliminate or reduce the likelihood that the rotation speed of the rotary brush 23*a* will suddenly decrease due to the sudden decrease in the supply flow rate Q1 and the operator will recognize that the sweeper 23 undergoes failure or the like and stop the operation of the CLT 1. That is, it is possible to prevent or reduce wrong operations and the like caused by the hesitation of the operator.

The special flow rate control system 90, 90A, 90B may, if it is determined that the total required flow rate SR is greater than the maximum delivery flow rate Dm, gradually reduce the supply flow rate Q1 at a constant rate to allow the supply flow rate Q2 to approach the required flow rate R2.

With this configuration, the supply flow rate Q1 decreases continuously at a constant rate. Therefore, also while the rotation speed of the rotary brush 23*a* is decreasing, the phenomenon in which the speed sometimes suddenly drops does not occur. This makes it possible to enhance the effect of allowing the operator not to recognize the decrease in rotation speed of the rotary brush 23*a*.

The special flow rate control system 90, 90A, 90B may, if it is determined that the total required flow rate SR is greater than the maximum delivery flow rate Dm, reduce the supply flow rate Q1 which is less than the required flow rate R1 to a lower supply flow rate stepwise to allow the supply flow rate Q2 to approach the required flow rate R2.

With this configuration, it is possible to reduce the supply flow rate Q1 stepwise such that, for example, whether the supply flow rate Q2 has reached the required flow rate R2 is checked after hydraulic fluid has been supplied at a constant supply flow rate Q1 for a certain period of time, and, if the supply flow rate Q2 has not reached the required flow rate R2, the supply flow rate Q1 is reduced by a step and hydraulic fluid continues to be supplied at that reduced supply flow rate Q1 for a certain period of time.

The special flow rate control system 90, 90A, 90B may, if it is determined that the total required flow rate SR which was greater than the maximum delivery flow rate Dm has decreased to the maximum delivery flow rate Dm or less due to operation of the AUX operation switch 9 or the work operation lever 8, increase the reduced supply flow rate Q1 to allow the supply flow rate Q1 to approach the required flow rate R1.

The above configuration is applicable to cases where, for example, in the case of the CTL 1 (working machine) equipped with the sweeper 23, when the work operation lever 8 is operated to lower the lift arms 10 to bring the sweeper 23 into contact with the ground and resume cleaning after the CTL 1 makes a turn while the rotary brush 23*a* is rotated at low speed and the lift arms 10 are raised as described earlier. Specifically, since the supply flow rate Q1 which was reduced while the lift arms 10 were raised because the total required flow rate SR was greater than the maximum delivery flow rate Dm is increased to the required flow rate R1 upon a decrease in the total required flow rate SR to the maximum delivery flow rate Dm or less in response to the operation of the work operation lever 8 to lower the lift arms 10, the rotary brush 23*a* rotates at a speed set using the AUX operation switch 9 or at a speed close to the set speed to allow the sweeper 23 to resume cleaning immediately after the sweeper 23 is brought into contact with the ground again after the CTL 1 makes a turn.

The hydraulic system 30, 30A, 30B may further include a LS system 70 (pump controller) to control a flow rate D of hydraulic fluid delivered by the hydraulic pump 31. The LS system 70 may control the hydraulic pump 31 such that a delivery pressure P2 which is a pressure of hydraulic fluid delivered by the hydraulic pump 31 is greater than a greatest one of load pressures P1 of the hydraulic motor 24 and the lift arm cylinder 14 by a predetermined load sensing differential pressure P0.

With this configuration, in the case where the hydraulic motor 24 and the lift arm cylinders 14 (hydraulic actuators) are driven concurrently as described earlier, provided that the total required flow rate SR is equal to or less than the maximum delivery flow rate Dm, the LS system 70 (pump controller) can increases the delivery flow rate D of the hydraulic pump 31 to the maximum delivery flow rate Dm. By ensuring that the delivery flow rate D is equal to or greater than the total required flow rate SR, it is possible to supply hydraulic fluid at the supply flow rates Q1 and Q2 equal to the respective required flow rates D1 and D2 to the hydraulic actuators 24 and 14. That is, the hydraulic system 30, 30A, 30B can be configured such that the LS system 70 functions to control the delivery flow rate D when the total required flow rate SR is equal to or less than the maximum delivery flow rate Dm, and that the special flow rate control system 90 functions to control the supply flow rates Q1 and Q2 when the total required flow rate SR is greater than the maximum delivery flow rate Dm.

The hydraulic system 30, 30A, 30B may further include a pressure compensating valve 73 to keep a hydraulic pressure set for hydraulic fluid supplied to the hydraulic motor 24 (first hydraulic actuator).

With this configuration, the supply flow rate Q1 of fluid supplied to the hydraulic motor 24 is reduced, and the flow rate of hydraulic fluid passing through the pressure compensating valve 73 can be reduced accordingly. This makes it possible to prevent or reduce an increase in temperature of the pressure compensating valve 73 and improve the durability of the pressure compensating valve 73.

The hydraulic system 30, 30A, 30B may further include a fluid discharge passage 34 to allow hydraulic fluid delivered by the hydraulic pump 31 to flow therein, a branch fluid passage 38 (first branch fluid passage) branching from the fluid discharge passage 34, a AUX control valve 43, 96 (first control valve) operable to allow hydraulic fluid supplied through the branch fluid passage 38 from the fluid discharge passage 34 to be supplied to the hydraulic motor 24, a branch fluid passage 36 (second branch fluid passage) branching from the fluid discharge passage 34 and parallel to the branch fluid passage 38, and a lift arm control valve 41 (second control valve) operable to allow hydraulic fluid supplied through the branch fluid passage 36 from the fluid discharge passage 34 to be supplied to the lift arm cylinder 14. The controller 26 may be configured or programmed to control a position of the AUX control valve 43, 96 such that the supply flow rate Q1 matches the required flow rate R1. The flow rate controller 27 may be configured or programmed to control a position of the lift arm control valve 41 such that the supply flow rate Q2 matches the required flow rate R2. The special flow rate control system 90, 90A may, if it is determined that the total required flow rate SR is greater than the maximum delivery flow rate Dm, allow the supply flow rate to approach the required flow rate R2 by causing the controller 26 to change the position of the AUX control valve 43, 96 to gradually reduce the supply flow rate Q1 which is less than the required flow rate R1 to a lower supply flow rate while causing the flow rate controller 27 to hold the lift arm control valve 41 in a position that allows the supply flow rate Q2 to match the required flow rate R2.

With this configuration, the AUX control valve 43, 96 (first control valve) and the lift arm control valve 41 (second control valve), which are connected to the fluid discharge passage 34 in parallel to each other via the branch fluid passages 38 and 36, share hydraulic fluid in the fluid discharge passage 34 (hydraulic fluid in the fluid discharge passage 34 is distributed to the AUX control valve 43, 96 and the lift arm control valve 41). Therefore, when the total required flow rate SR is greater than the maximum delivery flow rate Dm, the supply flow rate Q1 of fluid supplied to the hydraulic motor 24 and the supply flow rate Q2 of fluid supplied to the lift arm cylinders 14 become less than the respective required flow rates R1 and R2. In such circumstances, if the supply flow rate Q1 is reduced, the supply flow rate Q2 automatically increases to approach the required flow rate R2. Therefore, it is only necessary to specially configure only the controller 26 such that the controller 26 reduces the supply flow rate Q1 while leaving the flow rate controller 27 (second flow rate controller) unchanged to control the position of the lift arm control valve 41 to allow the supply flow rate Q2 to match the required flow rate R2, in cases where the total required flow rate SR is greater than the maximum delivery flow rate Dm. That is, it is possible to establish, at low cost, a hydraulic system in which, when a plurality of hydraulic actuators are driven concurrently, the supply flow rate of fluid supplied to prioritized hydraulic actuator(s) does not decrease below the required flow rate (or does not decrease significantly below the required flow rate).

In the hydraulic system 30, the AUX control valve 43 may be configured such that the position thereof is controlled by pilot pressure fluid. The controller 26 may be configured or programmed to control a supply of the pilot pressure fluid to the AUX control valve 43.

With this configuration, for example, in the case where all the control valves for the hydraulic actuators including the AUX control valve 43 in the hydraulic system 30 are control valves controlled by pilot pressure, the controller 26 need only be configured such that, with regard to controlling supply of pilot pressure fluid to the AUX control valve 43, the controller 26 gradually reduces the supply flow rate Q1 less than the required flow rate R1 when the total required flow rate SR is greater than the maximum delivery flow rate Dm. This makes it possible to provide preferred embodiments of the present invention at low cost without having to add any special elements.

The hydraulic system 30 may further include a solenoid valve 59, 60 to supply the pilot pressure fluid to the AUX control valve 43. The controller 26 may be configured or programmed to output a control signal CS1 to control an opening of the solenoid valve 59, 60.

With this configuration, it is possible to change the control of supply of pilot pressure fluid to the AUX control valve 43 merely by changing an electric signal as the control signal CS1 supplied to the solenoid valve(s) 59 and/or 60. That is, in order to gradually reduce the supply flow rate Q1 less than the required flow rate R1 when the total required flow rate SR is greater than the maximum delivery flow rate Dm, it is only necessary to perform a simple method such as changing program(s) of the controller 26 to change the control signal CS1, making it possible to provide preferred embodiments of the present invention at low cost without having to add any special elements.

In the hydraulic system 30A, the AUX control valve 96 may be a solenoid valve. The controller 26 may be configured or programmed to output, to the AUX control valve 96, a control signal CS1*a* to control energization of a solenoid of the solenoid valve.

With this configuration, since the AUX control valve 96 positionally controlled to control the supply flow rate Q1 of fluid supplied to the hydraulic motor 24 is a solenoid valve, the controller 26 need only directly output, to the AUX control valve 96, the control signal CS1*a* which is an electric signal to control the position of the AUX control valve 96, making it unnecessary to provide solenoid valves such as the foregoing solenoid valves 59 and 60 to control the supply of pilot pressure fluid independently of the AUX control valve 96. This makes it possible to reduce the number of elements, resulting in a simpler and more compact hydraulic system.

The special flow rate control system 90B may include a variable throttle 97 provided in a fluid supply/discharge passage 48 to allow hydraulic fluid supplied to the hydraulic motor 24 to flow therein. The special flow rate control system 90B may, if it is determined that the total required flow rate SR is greater than the maximum delivery flow rate Dm, cause the controller 26 to increase a degree of closing of the variable throttle 97 to reduce the supply flow rate Q1 to allow the supply flow rate Q2 to approach the required flow rate R2.

With this configuration, by merely providing the fluid supply/discharge passage 48 to allow hydraulic fluid supplied to the hydraulic motor 24 to flow therein with a variable throttle 97, it is possible to easily achieve a configuration in which, when the total required flow rate SR is greater than the maximum delivery flow rate Dm, the supply flow rate Q1 is reduced to allow the supply flow rate Q2 to reach the required flow rate R2.

The hydraulic system 30B may further include a fluid discharge passage 34 to allow hydraulic fluid delivered by the hydraulic pump 31 to flow therein, a branch fluid passage 38 (first branch fluid passage) branching from the fluid discharge passage 34, an AUX control valve 43, 96 (first control valve) which is operable to receive hydraulic fluid through the branch fluid passage 38 from the fluid discharge passage 34 and whose position is controlled by the controller 26 to control the supply flow rate Q1, a branch fluid passage 36 (second branch fluid passage) branching from the fluid discharge passage 34 and parallel to the branch fluid passage 38, and a lift arm control valve 41 (second control valve) which is operable to receive hydraulic fluid through the branch fluid passage 36 from the fluid discharge passage 34 and whose position is controlled by the flow rate controller 27 to control the supply flow rate Q2. The controller 26 may be configured or programmed to control a position of the AUX control valve 43, 96 such that the supply flow rate Q1 matches the required flow rate R1. The flow rate controller 27 may be configured or programmed to control a position of the lift arm control valve 41 such that the supply flow rate Q2 matches the required flow rate R2. The special flow rate control system 90B may, if it is determined that the total required flow rate SR is greater than the maximum delivery flow rate Dm, while causing the flow rate controller 27 to hold the lift arm control valve 41 in a position that allows the supply flow rate Q2 to match the required flow rate R2 and causing the controller 26 to hold the AUX control valve 43(96) in a position that allows the supply flow rate Q1 to match the required flow rate R1, increase the degree of closing of the variable throttle 97 to reduce the supply flow rate Q1 to allow the supply flow rate Q2 to approach the required flow rate R2.

With this configuration, the AUX control valve 43, 96 (first control valve) and the lift arm control valve 41 (second control valve), which are connected to the fluid discharge passage 34 in parallel to each other via the branch fluid passages 38 and 36, share hydraulic fluid in the fluid discharge passage 34 (hydraulic fluid in the fluid discharge passage 34 is distributed to the AUX control valve 43, 96 and the lift arm control valve 41). Therefore, when the total required flow rate SR is greater than the maximum delivery flow rate Dm, the supply flow rate Q1 of fluid supplied to the hydraulic motor 24 and the supply flow rate Q2 of fluid supplied to the lift arm cylinders 14 become less than the respective required flow rates R1 and R2. In such circumstances, if the supply flow rate Q1 is reduced, the supply flow rate Q2 automatically increases to approach the required flow rate R2. Furthermore, since the supply flow rate Q1 is controlled by the variable throttle 97 to decrease, the position of the AUX control valve 43, 96 need only be always controlled to a position that allows the required flow rate R1 to match the supply flow rate Q1, making it possible to simplify the control of the AUX control valve 43, 96.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A hydraulic system for a working machine, the hydraulic system comprising:

- a hydraulic pump;
- a first hydraulic actuator to be actuated by hydraulic fluid delivered by the hydraulic pump;
- a second hydraulic actuator to be actuated by hydraulic fluid delivered by the hydraulic pump;
- a first manual operator to be operated to set a first required flow rate;
- a second manual operator to be operated to set a second required flow rate;
- a first flow rate controller to control a first supply flow rate which is a flow rate of hydraulic fluid supplied to the first hydraulic actuator such that the first supply flow rate matches the first required flow rate set by operating the first manual operator;
- a second flow rate controller to control a second supply flow rate which is a flow rate of hydraulic fluid supplied to the second hydraulic actuator such that the second supply flow rate matches the second required flow rate set by operating the second manual operator; and
- a special flow rate control system to, when it is determined that a total required flow rate which is a sum of the first required flow rate and the second required flow rate is greater than a maximum delivery flow rate which is a maximum flow rate of hydraulic fluid deliverable by the hydraulic pump, gradually or stepwise reduce the first supply flow rate to allow the second supply flow rate to approach the second required flow rate.

2. The hydraulic system according to claim 1, wherein the special flow rate control system is operable to, when it is determined that the total required flow rate is greater than the maximum delivery flow rate, set a limited required flow rate which is less than the first required flow rate and reduce the first supply flow rate to the limited required flow rate to allow the second supply flow rate to approach the second required flow rate.

3. The hydraulic system according to claim 1, wherein the special flow rate control system is operable to, when it is determined that the total required flow rate is greater than the maximum delivery flow rate, set a limited required flow rate which is equal to or less than a difference between the maximum delivery flow rate and the second required flow rate and reduce the first supply flow rate to the limited required flow rate to allow the second supply flow rate to approach the second required flow rate.

4. The hydraulic system according to claim 1, wherein the special flow rate control system is operable to, when it is determined that the total required flow rate is greater than the maximum delivery flow rate when the second required flow rate is set after the first required flow rate is set, reduce the first supply flow rate which is less than the first required flow rate to a lower flow rate to allow the second supply flow rate to approach the second required flow rate.

5. The hydraulic system according to claim 1, wherein the special flow rate control system is operable to, when it is determined that the total required flow rate is greater than the maximum delivery flow rate when the second required flow rate is set after the first required flow rate is set, reduce the first supply flow rate to allow the second supply flow rate to approach the second required flow rate.

6. The hydraulic system according to claim 1, wherein the special flow rate control system is operable to, when it is determined that the total required flow rate is greater than the maximum delivery flow rate, gradually reduce the first supply flow rate to allow the second supply flow rate to approach the second required flow rate.

7. The hydraulic system according to claim 1, wherein the special flow rate control system is operable to, when it is determined that the total required flow rate is greater than the maximum delivery flow rate, gradually reduce the first supply flow rate at a constant rate to allow the second supply flow rate to approach the second required flow rate.

8. The hydraulic system according to claim 1, wherein the special flow rate control system is operable to, when it is determined that the total required flow rate is greater than the maximum delivery flow rate, reduce the first supply flow rate stepwise to allow the second supply flow rate to approach the second required flow rate.

9. The hydraulic system according to claim 1, wherein the special flow rate control system is operable to, when it is determined that the total required flow rate which was greater than the maximum delivery flow rate has decreased to the maximum delivery flow rate or less due to operation of the first manual operator or the second manual operator, increase the reduced first supply flow rate to allow the first supply flow rate to approach the first required flow rate.

10. The hydraulic system according to claim 1, further comprising:

a pump controller to control a flow rate of hydraulic fluid delivered by the hydraulic pump; wherein the pump controller is operable to control the hydraulic pump such that a delivery pressure which is a pressure of hydraulic fluid delivered by the hydraulic pump is greater than a greatest one of load pressures of the first hydraulic actuator and the second hydraulic actuator by a predetermined load sensing differential pressure.

11. The hydraulic system according to claim 10, further comprising a pressure compensating valve to keep a hydraulic pressure set for hydraulic fluid supplied to the first hydraulic actuator.

12. The hydraulic system according to claim 1, further comprising:

a fluid discharge passage to allow hydraulic fluid delivered by the hydraulic pump to flow therein;

a first branch fluid passage branching from the fluid discharge passage;

a first control valve to allow hydraulic fluid supplied through the first branch fluid passage from the fluid discharge passage to be supplied to the first hydraulic actuator;

a second branch fluid passage branching from the fluid discharge passage and parallel to the first branch fluid passage; and a second control valve to allow hydraulic fluid supplied through the second branch fluid passage from the fluid discharge passage to be supplied to the second hydraulic actuator; wherein the first flow rate controller is configured or programmed to control a position of the first control valve such that the first supply flow rate matches the first required flow rate;

the second flow rate controller is configured or programmed to control a position of the second control valve such that the second supply flow rate matches the second required flow rate; and the special flow rate control system is operable to, when it is determined that the total required flow rate is greater than the maximum delivery flow rate, allow the second supply flow rate to approach the second required flow rate by causing the first flow rate controller to change the position of the first control valve to reduce the first supply flow rate while causing the second flow rate controller to hold the second control valve in a position that allows the second supply flow rate to match the second required flow rate.

13. The hydraulic system according to claim 12, wherein a position of the first control valve is controllable by pilot pressure fluid; and the first flow rate controller is configured or programmed to control a supply of the pilot pressure fluid to the first control valve.

14. The hydraulic system according to claim 13, further comprising a solenoid valve to supply the pilot pressure fluid to the first control valve; wherein the first flow rate controller is configured or programmed to output a control signal to control an opening of the solenoid valve.

15. The hydraulic system according to claim 12, wherein the first control valve is a solenoid valve; and the first flow rate controller is configured or programmed to output, to the first control valve, a control signal to control energization of a solenoid of the solenoid valve.

16. The hydraulic system according to claim 1, wherein the special flow rate control system includes a variable throttle provided in a fluid passage to allow hydraulic fluid supplied to the first hydraulic actuator to flow therein; and the special flow rate control system is operable to, when it is determined that the total required flow rate is greater than the maximum delivery flow rate, cause the first flow rate controller to increase a degree of closing of the variable throttle to reduce the first supply flow rate to allow the second supply flow rate to approach the second required flow rate.

17. The hydraulic system according to claim 16, further comprising:

a fluid discharge passage to allow hydraulic fluid delivered by the hydraulic pump to flow therein;

a first branch fluid passage branching from the fluid discharge passage;

a first control valve to allow hydraulic fluid supplied through the first branch fluid passage from the fluid discharge passage to be supplied to the first hydraulic actuator;

a second branch fluid passage branching from the fluid discharge passage and parallel to the first branch fluid passage; and a second control valve to allow hydraulic fluid supplied through the second branch fluid passage from the fluid discharge passage to be supplied to the second hydraulic actuator, wherein the first flow rate controller is configured or programmed to control a position of the first control valve such that the first supply flow rate matches the first required flow rate;

the second flow rate controller is configured or programmed to control a position of the second control valve such that the second supply flow rate matches the second required flow rate; and the special flow rate control system is operable to, when it is determined that the total required flow rate is greater than the maximum delivery flow rate, while causing the second flow rate controller to hold the second control valve in a position that allows the second supply flow rate to match the second required flow rate and causing the first flow rate controller to hold the first control valve in a position that allows the first supply flow rate to match the first required flow rate, increase the degree of closing of the variable throttle to reduce the first supply flow rate to allow the second supply flow rate to approach the second required flow rate.

* * * * *